United States Patent
Deng

(10) Patent No.: US 11,606,768 B2
(45) Date of Patent: Mar. 14, 2023

(54) METHOD AND APPARATUS FOR REGISTRATION

(71) Applicant: Huawei Technologies Co., Ltd., Shenzhen (CN)

(72) Inventor: Juan Deng, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 24 days.

(21) Appl. No.: 17/180,032

(22) Filed: Feb. 19, 2021

(65) Prior Publication Data
US 2021/0185631 A1  Jun. 17, 2021

Related U.S. Application Data

(63) Continuation of application No. PCT/CN2020/113777, filed on Sep. 7, 2020.

(30) Foreign Application Priority Data

Sep. 29, 2019 (CN) .................... 201910932460.0
Nov. 8, 2019 (CN) .................... 201911089396.0

(51) Int. Cl.
| H04W 12/06 | (2021.01) |
| H04W 60/04 | (2009.01) |
| H04W 12/037 | (2021.01) |
| H04W 12/041 | (2021.01) |
| H04W 8/08 | (2009.01) |
| H04W 48/16 | (2009.01) |

(52) U.S. Cl.
CPC ............ *H04W 60/04* (2013.01); *H04W 8/08* (2013.01); *H04W 12/037* (2021.01); *H04W 12/041* (2021.01); *H04W 12/06* (2013.01); *H04W 48/16* (2013.01)

(58) Field of Classification Search
None
See application file for complete search history.

(56) References Cited

U.S. PATENT DOCUMENTS

2018/0227873 A1  8/2018  Vrzic et al.

FOREIGN PATENT DOCUMENTS

| CN | 109257815 A | 1/2019 |
| CN | 110291837 A | 9/2019 |
| WO | 2019034021 A1 | 2/2019 |
| WO | 2019072681 A1 | 4/2019 |
| WO | 2021093160 A1 | 5/2021 |

OTHER PUBLICATIONS

3GPP TS 33.501,Security architecture and procedures for 5G system, Sep. 25, 2019, V15.6.0. (Year: 2019).*

(Continued)

*Primary Examiner* — Said M Elnoubi
(74) *Attorney, Agent, or Firm* — Conley Rose, P.C.

(57) ABSTRACT

A method for registration is used in an access and mobility management function (AMF) redirection scenario. The registration method includes determining, by a first AMF selected, during AMF redirection, to serve a user equipment (UE), to protect a first message, and sending the protected first message to the UE, where the first message includes an authentication request message.

18 Claims, 11 Drawing Sheets

(56) References Cited

OTHER PUBLICATIONS

Ericsson, Discussion about the AMF re-allocation due to slicing, S3-192887, Aug. 2019, 3GPP TSG-SA WG3 Meeting #96. (Year: 2019).*

Ericsson, "Discussion about the AMF re-allocation due to slicing", 3GPP TSG-SA WG3 Meeting #96 S3-192887, Wroclaw, Poland, Aug. 26-30, 2019, 10 pages.

Ericsson, "AMF reallocation and slicing", 3GPP TSG-SA WG3 Meeting #96 S3-192888, Wroclaw, Poland, Aug. 26-30, 2019, 3 pages.

Huawei et al., "Registration failures in registration procedure with AMF reallocation", 3GPP TSG-SA WG3 Meeting #95Bis S3-192159, Sapporo (Japan), Jun. 24-26, 2019, 7 pages.

3GPP TS 23.502 V16.2 0, "3rd Generation Partnership Project; Technical Specification Group Services and System Aspects; Procedures for the 5G System (5GS); Stage 2 (Release 16)," Sep. 2019, 1084 pages.

3GPP TS 33.501 V16.0.0, "3rd Generation Partnership Project; Technical Specification Group Services and System Aspects; Security architecture and procedures for 5G system (Release 16)," Sep. 2019, 196 pages.

3GPP TSG-SA WG3 Meeting #94, S3-190153, "Handling of AMF redirection," ZTE Corporation, Kochi (India), Jan. 28-Feb. 1, 2019, 3 pages.

3GPP TSG-SA WG3 Meeting #94, S3-190262, "EUTRA connected to 5GC: clauses 6.9.3 and 6.9.4," Ericsson, Kochi (India), Jan. 28-Feb. 1, 2019, 5 pages.

* cited by examiner

US 11,606,768 B2

METHOD AND APPARATUS FOR REGISTRATION

CROSS-REFERENCE TO RELATED APPLICATIONS

This application is a continuation of International Patent Application No. PCT/CN2020/113777 filed on Sep. 7, 2020, which claims priority to Chinese Patent Application No. 201910932460.0 filed on Sep. 29, 2019 and Chinese Patent Application No. 201911089396.0 filed on Nov. 8, 2019, all of which are hereby incorporated by reference in their entireties.

TECHNICAL FIELD

This application relates to the communications field, and more specifically, to a method and an apparatus for registration.

BACKGROUND

The 5th generation (5G) communications protocol defines an access and mobility management function (AMF) redirection procedure of user equipment (UE) in a registration procedure. In the registration procedure, first, the UE sends, to a (radio) access network ((R)AN), a registration request (RR) message that carries a 5G globally unique temporary UE identity (5G-GUTI) or a subscriber concealed identifier (SUCI) of the UE. Then, after receiving the RR message of the UE, the (R)AN sends the RR message to an initial AMF. The initial AMF finds, based on the 5G-GUTI, a second AMF (old AMF) that previously serves the UE, and obtains a context of the UE from the second AMF. The context of the UE includes a non-access stratum (NAS) security context of the UE. Finally, the initial AMF initiates AMF redirection based on some trigger conditions, to redirect to a first AMF. The first AMF (target AMF) may obtain the context of the UE from the initial AMF.

Currently, in the AMF redirection procedure stipulated in the protocol, the initial AMF may directly forward the complete RR message to the first AMF. In this case, if the first AMF sends an authentication request message to the UE, the UE may discard the authentication request message. Consequently, registration of the UE fails.

SUMMARY

This application provides a method and an apparatus for registration. The method for registration is used in an AMF redirection scenario. When receiving, from an initial AMF, first indication information indicating to protect an authentication request message, a first AMF sends the protected authentication request message to UE. This prevents the UE from discarding the authentication request message, and increases a probability of successful registration of the UE.

According to a first aspect, a method for registration is provided, including a first AMF receives first indication information from an initial AMF. The first AMF protects a first message based on the first indication information. The first AMF sends the protected first message to UE. The first AMF is a target AMF selected, during AMF redirection, to serve the UE. The first message is one of the following messages an authentication request message, an N1 message, or an N1 message other than a NAS security mode command (SMC) message. Alternatively, a first AMF receives first indication information from an initial AMF. Based on the first indication information, the first AMF does not perform primary authentication, or skips a primary authentication procedure and performs another procedure in a registration procedure, or uses a received AMF key (KAMF).

The first AMF protects the N1 message by using a received NAS security context or the KAMF.

According to the method for registration provided in this embodiment of this application, the initial AMF may send the first indication information to the first AMF. Then, the first AMF sends the protected authentication request message to the UE. This prevents the UE from discarding the authentication request message, and increases probability of successful registration of the UE. Alternatively, according to the method for registration provided in this embodiment of this application, the initial AMF may send the first indication information to the first AMF to indicate the first AMF not to perform the primary authentication procedure. Then, the first AMF sends the protected N1 message to the UE.

The "protected first message" in the embodiments of this application includes an integrity protected first message or a first message on which integrity and encryption protection has been performed. When the first message is the NAS SMC message, the protected first message is the integrity protected first message. When the first message is the N1 message other than the NAS SMC message, the protected first message is the first message on which integrity and encryption protection has been performed. For ease of description, the first message is briefly referred to as the protected first message below.

With reference to the first aspect, in some implementations of the first aspect, that the first AMF receives the first indication information from the initial AMF includes the first AMF receives a first service operation from the initial AMF. The first service operation includes the first indication information.

According to the method for registration provided in this embodiment of this application, the initial AMF may send the first indication information to the first AMF by including the first indication information in the first service operation and sending the first service operation to the first AMF. In a possible implementation, the first service operation is a Namf_Communication_N1MessageNotify service operation.

It should be understood that, in this application, the first indication information is not definitely carried in the first service operation, and a flexible and optional solution is provided for the initial AMF to send the first indication information to the first AMF.

When the first indication information is carried in existing signaling of the initial AMF and the first AMF, signaling overheads can be reduced.

With reference to the first aspect, in some implementations of the first aspect, the first service operation further includes a NAS security context. That the first AMF protects the first message includes the first AMF protects the first message by using the NAS security context.

According to the method for registration provided in this embodiment of this application, the first service operation sent by the initial AMF to the first AMF may further include the NAS security context, so that the first AMF can protect the first message by using the received NAS security context. This provides a feasible solution for the first AMF to protect the first message.

With reference to the first aspect, in some implementations of the first aspect, the first indication information is used to indicate at least one of the following cases the UE and the initial AMF have securely exchanged a NAS message, the first AMF should protect the first message by using the received NAS security context, the UE and the initial AMF have established a security context, the UE and the initial AMF have established a security association, the UE and the initial AMF have activated security protection, the UE and the initial AMF have successfully performed a NAS SMC, the first AMF should use the received KAMF, the first AMF does not perform the primary authentication procedure, the first AMF skips the primary authentication procedure and performs another procedure in registration, or the first AMF should use the received KAMF.

According to the method for registration provided in this embodiment of this application, the first indication information is used to indicate the first AMF to protect the first message, and/or the first indication information is used to indicate that the UE and the initial AMF have securely exchanged the NAS message, and/or the first message may be used by the first AMF to protect the first message by using the received NAS security context. This provides a flexible and optional solution for a specific indication form of the first indication information. Alternatively, the first indication information may be used to indicate, in different manners, that the first AMF does not perform primary authentication.

According to a second aspect, a method for registration is provided, including an initial AMF determines to send first indication information to a first AMF. The first indication information is used to indicate the first AMF to protect a first message. The initial AMF sends the first indication information to the first AMF. The first AMF is a target AMF selected, during AMF redirection, to serve the UE. The first message is one of the following messages an authentication request message, an N1 message, or an N1 message other than a NAS SMC message. Alternatively, an initial AMF determines to send first indication information to a first AMF. The first indication information is used to indicate the first AMF not to perform primary authentication, or skip a primary authentication procedure and perform another procedure in a registration procedure, or use a received KAMF.

The initial AMF sends the first indication information to the first AMF, where the first AMF is a target AMF selected, during AMF redirection, to serve the UE.

According to the method for registration provided in this embodiment of this application, the initial AMF may send the first indication information to the first AMF. Then, the first AMF sends the protected authentication request message to the UE. This prevents the UE from discarding the authentication request message, and increases probability of successful registration of the UE. Alternatively, the initial AMF may send the first indication information to the first AMF, so that the first AMF does not perform the primary authentication procedure. This provides a visible solution for the first AMF not to perform primary authentication.

With reference to the second aspect, in some implementations of the second aspect, that the initial AMF determines to send the first indication information to the first AMF includes the initial AMF determines, based on a first preset condition, to send the first indication information to the first AMF. The first preset condition includes at least one of the following conditions the UE and the initial AMF have securely exchanged a NAS message, the UE and the initial AMF have established a security context, the UE and the initial AMF have successfully performed a NAS SMC, the UE and the initial AMF have activated a security association, the UE and the initial AMF have activated security protection, the UE and the initial AMF have performed primary authentication, the initial AMF selects a security algorithm different from a security algorithm selected by a second AMF, or the initial AMF uses the KAMF that is generated after horizontal KAMF derivation and that is received from the second AMF. The second AMF is an AMF that previously serves the UE.

According to the method for registration provided in this embodiment of this application, the initial AMF determines to send the first indication information to the first AMF only when determining that the first preset condition is met. This provides a feasible solution for the initial AMF to determine how to send the first indication information.

With reference to the second aspect, in some implementations of the second aspect, that the initial AMF sends the first indication information to the first AMF includes the initial AMF sends a first service operation to the first AMF. The first service operation includes the first indication information.

According to the method for registration provided in this embodiment of this application, the initial AMF may send the first indication information to the first AMF by including the first indication information in the first service operation and sending the first service operation to the first AMF. This provides a flexible and optional solution for the initial AMF to send the first indication information to the first AMF. In a possible implementation, the first service operation is a Namf_Communication_N1MessageNotify service operation.

With reference to the second aspect, in some implementations of the second aspect, the first service operation further includes a NAS security context.

According to the method for registration provided in this embodiment of this application, the first service operation sent by the initial AMF to the first AMF may further include the NAS security context, so that the first AMF can protect the first message by using the received NAS security context. This provides a feasible solution for the first AMF to protect the first message.

With reference to the second aspect, in some implementations of the second aspect, the first indication information is used to indicate at least one of the following cases the UE and the initial AMF have securely exchanged the NAS message, the first AMF should protect the first message by using the NAS security context, the UE and the initial AMF have established the security context, the UE and the initial AMF have established a security association, the UE and the initial AMF have activated security protection, the UE and the initial AMF have successfully performed the NAS SMC, the first AMF should use the received KAMF, the first AMF does not perform the primary authentication procedure, the first AMF skips the primary authentication procedure and performs another procedure in registration, or the first AMF should use the received KAMF.

According to the method for registration provided in this embodiment of this application, that the first indication information is used to indicate the first AMF to protect the first message may specifically indicate that the UE and the initial AMF have securely exchanged the NAS message, and/or indicate the first AMF to protect the first message by using the received NAS security context. This provides a flexible and optional solution for a specific indication form of the first indication information. Alternatively, the first indication information may be used to indicate, in different manners, that the first AMF does not perform primary authentication.

According to a third aspect, a method for registration is provided, including UE accepts a protected first message from a first AMF. The first AMF is a target AMF selected, during AMF redirection, to serve the UE. The first message is one of the following messages an authentication request message, an N1 message, or an N1 message other than a NAS SMC message.

According to the method for registration provided in this embodiment of this application, the UE receives the protected authentication request message. This prevents the UE from discarding the authentication request message, and increases a probability of successful registration of the UE.

According to a fourth aspect, a method for registration is provided, including UE receives second indication information from an initial AMF. The second indication information is used to indicate the UE to accept an unprotected first message. The UE accepts, based on the second indication information, the unprotected first message from the first AMF. The first AMF is a target AMF selected, during AMF redirection, to serve the UE. The first message is one of the following messages an authentication request message, an N1 message, or an N1 message other than NAS SMC message.

According to the method for registration provided in this embodiment of this application, the initial AMF may send the second indication information to the UE, so that the UE accepts the unprotected authentication request message. This prevents the UE from discarding the authentication request message, and increases a probability of successful registration of the UE.

According to a fifth aspect, a method for registration is provided, including an initial AMF determines, based on a second preset condition, to send second indication information to UE. The second indication information is used to indicate the UE to accept an unprotected first message. The first message is one of the following messages an authentication request message, an N1 message, or an N1 message other than a NAS SMC message. The initial AMF sends the second indication information to the UE.

According to the method for registration provided in this embodiment of this application, the initial AMF may send the second indication information to the UE, so that the UE accepts the unprotected authentication request message. This prevents the UE from discarding the authentication request message, and increases a probability of successful registration of the UE.

With reference to the fifth aspect, in some implementations of the fifth aspect, the initial AMF determines, based on the second preset condition, to send the second indication information to the UE. The preset condition includes at least one of the following conditions the initial AMF and the UE have securely exchanged a NAS message, the initial AMF determines to perform AMF redirection, the UE and the initial AMF have established a security context, the UE and the initial AMF have successfully performed a NAS SMC, the UE and the initial AMF have activated a security association, the UE and the initial AMF have activated security protection, the UE and the initial AMF have performed primary authentication, the initial AMF selects a security algorithm different from a security algorithm selected by the second AMF, or the initial AMF uses a KAMF that is generated after horizontal KAMF derivation and that is received from the second AMF. The second AMF is an AMF that previously serves the UE.

According to a sixth aspect, a method for registration is provided, including a first AMF receives a first service operation sent by an initial AMF. The first AMF protects a first message. The first AMF sends the protected first message to UE. The first AMF is a target AMF selected, during AMF redirection, to serve the UE. The first message is one of the following messages an authentication request message, an N1 message, or an N1 message other than a NAS SMC message. A first AMF receives a first service operation sent by an initial AMF. The first AMF skips a primary authentication procedure. The first AMF sends a protected N1 message to UE. The first AMF is a target AMF selected, during AMF redirection, to serve the UE.

According to the method for registration provided in this embodiment of this application, the first AMF may send the protected authentication request message to the UE after determining that AMF redirection occurs. This prevents the UE from discarding the authentication request message, and increases a probability of successful registration of the UE. Alternatively, according to the method for registration provided in this embodiment of this application, the initial AMF may send the first service operation to the first AMF to indicate the first AMF not to perform the primary authentication procedure. In this case, after determining that AMF redirection occurs, the first AMF may skip the primary authentication procedure, and perform another procedure in registration. In other words, after determining that AMF redirection occurs, the first AMF may not perform primary authentication, and the first AMF protects the N1 message by using a received NAS security context.

With reference to the sixth aspect, in some implementations of the sixth aspect, after the first AMF receives the first service operation sent by the initial AMF, the method for registration further includes the first AMF determines, based on the first service operation, that AMF redirection occurs.

According to the method for registration provided in this embodiment of this application, the first AMF may determine, based on information elements (IEs) carried in the first service operation, whether AMF redirection occurs. For example, if a type of the N1 message carried in the first service operation includes 5G mobility management (5GMM), the first AMF determines that AMF redirection occurs. For another example, if the first service operation carries a registration context container type IE, the first AMF determines that AMF redirection occurs.

With reference to the sixth aspect, in some implementations of the sixth aspect, that the first AMF protects the first message includes the first AMF protects the first message by using the received NAS security context.

In a possible implementation, the received NAS security context is a NAS security context that is carried in the first operation service and that is received by the first AMF from the initial AMF.

According to the method for registration provided in this embodiment of this application, the first AMF may protect the first message by using the received NAS security context. This provides a feasible solution for the first AMF to protect the first message.

According to a seventh aspect, a method for registration is provided, including UE accepts a protected first message from a first AMF. The first AMF is a target AMF selected, during AMF redirection, to serve the UE. The first message is one of the following messages an authentication request message, an N1 message, or an N1 message other than a NAS SMC message.

According to the method for registration provided in this embodiment of this application, the UE receives the protected authentication request message. This prevents the UE from discarding the authentication request message, and increases a probability of successful registration of the UE.

According to an eighth aspect, an apparatus for registration is provided. The apparatus for registration includes a processor, configured to implement functions of a first AMF in the methods described in the first aspect and the seventh aspect.

Optionally, the apparatus for registration may further include a memory. The memory is coupled to the processor. The processor is configured to implement the functions of the first AMF in the methods described in the first aspect and the seventh aspect. In a possible implementation, the memory is configured to store a program instruction and data. The memory is coupled to the processor. The processor may invoke the program instruction stored in the memory and execute the program instruction, to implement the functions of the first AMF in the methods described in the first aspect and the seventh aspect.

Optionally, the apparatus for registration may further include a communications interface. The communications interface is used by the apparatus for registration to communicate with another device. When the apparatus for registration is UE, the communications interface may be a transceiver, an input/output interface, a circuit, or the like.

In a possible design, the apparatus for registration includes a processor and a communications interface.

The processor is configured to run a computer program, so that the apparatus for registration implements any method described in the first aspect and the seventh aspect.

The processor communicates with the external through the communications interface.

It may be understood that the external may be an object other than the processor, or an object other than the apparatus.

In another possible design, the apparatus for registration is a chip or a chip system. The communications interface may be an input/output interface, an interface circuit, an output circuit, an input circuit, a pin, a related circuit, or the like on the chip or the chip system. The processor may alternatively be a processing circuit or a logic circuit.

According to a ninth aspect, an apparatus for registration is provided. The apparatus for registration includes a processor, configured to implement functions of an initial AMF in the methods described in the second aspect and the fifth aspect.

Optionally, the apparatus for registration may further include a memory. The memory is coupled to the processor. The processor is configured to implement the functions of the initial AMF in the methods described in the second aspect and the fifth aspect. In a possible implementation, the memory is configured to store a program instruction and data. The memory is coupled to the processor. The processor may invoke the program instruction stored in the memory and execute the program instruction, to implement the functions of the initial AMF in the methods described in the second aspect and the fifth aspect.

Optionally, the apparatus for registration may further include a communications interface. The communications interface is used by the apparatus for registration to communicate with another device. When the apparatus for registration is the initial AMF, the communications interface may be a transceiver, an input/output interface, a circuit, or the like.

In a possible design, the apparatus for registration includes a processor and a communications interface.

The processor communicates with the external through the communications interface.

The processor is configured to run a computer program, so that the apparatus for registration implements any method described in the second aspect and the fifth aspect.

It may be understood that the external may be an object other than the processor, or an object other than the apparatus.

In another possible design, the apparatus for registration is a chip or a chip system. The communications interface may be an input/output interface, an interface circuit, an output circuit, an input circuit, a pin, a related circuit, or the like on the chip or the chip system. The processor may alternatively be a processing circuit or a logic circuit.

According to a tenth aspect, an apparatus for registration is provided. The apparatus for registration includes a processor, configured to implement functions of UE in the methods described in the third aspect, the fourth aspect, and the eighth aspect.

Optionally, the apparatus for registration may further include a memory, and the memory is coupled to the processor. The processor is configured to implement the functions of the UE in the methods described in the third aspect, the fourth aspect, and the eighth aspect. In a possible implementation, the memory is configured to store a program instruction and data. The memory is coupled to the processor, and the processor may invoke the program instruction stored in the memory and execute the program instruction, to implement the functions of the UE in the methods described in the third aspect, the fourth aspect, and the eighth aspect.

Optionally, the apparatus for registration may further include a communications interface. The communications interface is used by the apparatus for registration to communicate with another device. When the apparatus for registration is UE, the communications interface may be a transceiver, an input/output interface, a circuit, or the like.

In a possible design, the apparatus for registration includes a processor and a communications interface.

The processor communicates with the external through the communications interface.

The processor is configured to run a computer program, so that the apparatus for registration implements any method described in the third aspect, the fourth aspect, and the eighth aspect.

It may be understood that the external may be an object other than the processor, or an object other than the apparatus.

In another possible design, the apparatus for registration is a chip or a chip system. The communications interface may be an input/output interface, an interface circuit, an output circuit, an input circuit, a pin, a related circuit, or the like on the chip or the chip system. The processor may alternatively be a processing circuit or a logic circuit.

According to an eleventh aspect, this application provides a computer-readable storage medium. The computer-readable storage medium stores an instruction, and when the instruction is run on a computer, the computer is enabled to perform the methods according to the foregoing aspects.

According to a twelfth aspect, this application provides a computer program product including an instruction, and when the computer program product runs on a computer, the computer is enabled to perform the methods according to the foregoing aspects.

According to a thirteenth aspect, a communications system is provided, including the apparatus for registration according to the eighth aspect, the apparatus for registration according to the ninth aspect, and the apparatus for registration according to the tenth aspect.

According to a fourteenth aspect, a chip system is provided, including a memory and a processor. The memory is configured to store a computer program. The processor is configured to invoke the computer program from the memory and run the computer program, so that a communications device on which the chip system is installed performs the method in any one of the possible implementations in the first aspect to the seventh aspect.

DESCRIPTION OF EMBODIMENTS

The following describes technical solutions of this application with reference to the accompanying drawings.

Figure 1:
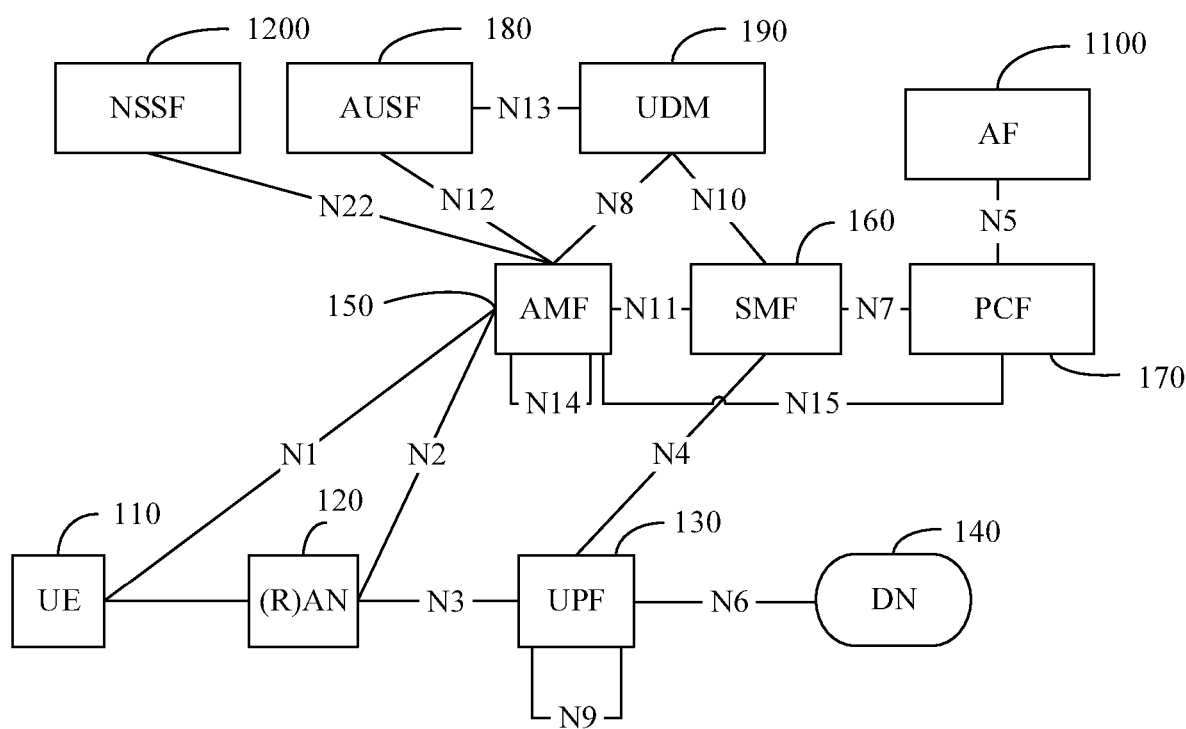
FIG. 1 is a network architecture applicable to an embodiment of this application.

FIG. 1 is a network architecture applicable to an embodiment of this application. As shown in FIG. 1, the following separately describes components in the network architecture.

1. UE 110 may include various handheld devices, vehicle-mounted devices, wearable devices, computing devices that have a wireless communication function, or other processing devices connected to a wireless modem, and terminals in various forms, such as a mobile station (MS), a terminal, UEUE, and a software client. For example, the UE 110 may be a water meter, an electricity meter, or a sensor.

For example, the UE in the embodiments of this application may be an access terminal, a subscriber unit, a subscriber station, a MS, a mobile console, a relay station, a remote station, a remote terminal, a mobile device, a user terminal, terminal equipment, a wireless communications device, a user agent, a user apparatus, or the like. The UE may alternatively be a cellular phone, a cordless phone, a Session Initiation Protocol (SIP) phone, a wireless local loop (WLL) station, a personal digital assistant (PDA), a handheld device or a computing device with a wireless communication function, another processing device connected to a wireless modem, a vehicle-mounted device, a wearable device, UE in a future 5G network, UE in a future evolved public land mobile network (PLMN), UE in future internet of vehicles, or the like. This is not limited in the embodiments of this application.

As an example instead of a limitation, in the embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that can be directly worn on a body or integrated into clothes or an accessory of a user. The wearable device is not merely a hardware device, but is used to implement a powerful function through software support, data interaction, and cloud interaction. In a broad sense, the wearable intelligent device includes full-featured and large-sized devices that can implement all or some of functions without depending on smartphones, for example, smart watches or smart glasses, and devices that focus only on one type of application function (AF) and need to be used with other devices such as smartphones, for example, various smart bands, or smart jewelry for monitoring physical signs.

In addition, the UE in the embodiments of this application may alternatively be UE in Internet of things (IoT) system. IoT is an important part of development of future information technologies. A main technical feature of the IoT is to connect an object to a network by using a communications technology, to implement an intelligent network of human-machine interconnection and thing-thing interconnection. In the embodiments of this application, an IoT technology may implement massive connections, deep coverage, and terminal power saving through, for example, a narrowband (NB) technology. In addition, in the embodiments of this application, the UE may further include sensors such as a smart printer, a train detector, and a gas station. Main functions include collecting data (some UEs), receiving control information and downlink data of an access network device, sending an electromagnetic wave, and transmitting uplink data to the access network device.

2. A (R)AN device 120 is configured to provide a network access function for authorized UEs in a specific area, and can use transmission tunnels of varying quality based on levels, service requirements, and the like of the UEs.

The (R)AN can manage radio resources and provide an access service for UE, to forward a control signal and UE data between the UE and a core network (CN). The (R)AN may also be understood as a base station in a conventional network.

For example, the access network device in the embodiments of this application may be any communications device that has a wireless transceiver function and that is configured to communicate with the UE. The access network device includes but is not limited to an evolved NodeB (eNB), a radio network controller (RNC), a NodeB (NB), a base station controller (BSC), a base transceiver station (BTS), a home base station, a home eNB (HeNB), home NB (HNB), a baseband unit (BBU), an access point (AP) in a WI-FI system, a wireless relay node, a wireless backhaul node, a transmission point (TP), a transmission and reception point (TRP), or the like. Alternatively, the access network device may be a next generation NB (gNB) or a TRP/TP in a 5G system, for example, a New Radio (NR) system, or one antenna panel or a group of antenna panels (including a plurality of antenna panels) of a base station in a 5G system. Alternatively, the access network device may be a network node, for example, a BBU or a distributed unit (DU), that constitutes a gNB or a TP.

In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer (PHY) protocol and a real-time service, and implements functions of a radio link control (RLC) layer, a media access control (MAC) layer, and a PHY The AAU implements some PHY processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the access network device may be a device including one or more of a CU node, a DU node, and an AAU node. In addition, the CU may be an access network device in a (R)AN, or may be an access network device in a CN. This is not limited in this application.

3. A user plane network element 130 is used for packet routing and forwarding, quality of service (QoS) processing of user plane data, and the like.

In a 5G communications system, the user plane network element may be a user plane function (UPF) network element. In a future communications system, the user plane network element may still be a UPF network element, or may have another name. This is not limited in this application.

4. A data network (DN) element 140 is configured to provide a network for data transmission.

In the 5G communications system, the DN element may still be a DN element. In the future communications system, the DN element may still be a DN element, or may have another name. This is not limited in this application.

5. An access management network element 150 is mainly configured to perform mobility management, access management, and the like. The access management network element 150 may be configured to implement functions, for example, lawful interception and access authorization/authentication, other than session management in functions of a mobility management entity (MME).

In the 5G communications system, the access management network element may be an AMF. In a future communications system, the access management network element may still be an AMF, or may have another name. This is not limited in this application.

6. A session management network element 160 is mainly configured to manage a session, assign and manage an internet protocol (IP) address of UE, select an endpoint that can manage a UPF interface and a policy control and charging function interface, notify downlink data, and the like.

In the 5G communications system, the session management network element may be a session management function (SMF) network element. In the future communications system, the session management network element may still be an SMF network element, or may have another name. This is not limited in this application.

7. A policy control network element 170 is configured to guide a unified policy framework of network behavior, and provide policy rule information for a control plane function network element (such as an AMF or an SMF network element), and the like.

In a 4th generation (4G) communications system, the policy control network element may be a policy and charging rules function (PCRF) network element. In the 5G communications system, the policy control network element may be a policy control function (PCF) network element. In the future communications system, the policy control network element may still be a PCF network element, or may have another name. This is not limited in this application.

8. An authentication server 180 is configured to authenticate a service, generate a key to implement two-way authentication for UE, and support a unified authentication framework.

In the 5G communications system, the authentication server may be an authentication server function (AUSF) network element. In the future communications system, the AUSF network element may still be an AUSF network element, or may have another name. This is not limited in this application.

9. A data management network element 190 is configured to process a UE identity, perform access authentication, registration, mobility management, and the like.

In the 5G communications system, the data management network element may be a unified data management (UDM) network element. In the 4G communications system, the data management network element may be a home subscriber server (HSS) network element. In the future communications system, the UDM may still be a UDM network element, or may have another name. This is not limited in this application.

10. An application network element 1100 is configured to perform application-affected data routing, access a network exposure function network element, interact with a policy framework to perform policy control, and the like.

In the 5G communications system, the application network element may be an AF network element. In the future communications system, the application network element may still be an AF network element, or may have another name. This is not limited in this application.

11. A network slice selection network element 1200 is configured to implement access mapping between UE and a network slice, and provide proper network slice access for the UE.

In the 5G communications system, the application network element may be a network slice selection function (NSSF) network element. In the future communications system, the application network element may still be an NSSF network element, or may have another name. This is not limited in this application.

It should be further understood that FIG. 1 is merely an example, and does not constitute any limitation on the protection scope of this application. The method for registration provided in the embodiments of this application may further relate to a network element that is not shown in FIG. 1. For example, the method for registration provided in the embodiments of this application further relates to a network storage network element. The network storage network element is configured to maintain real-time information of all network function (NF) services in a network.

In the 5G communications system, the network storage network element may be a network repository function (NRF) network element. In the future communications system, the network storage network element may still be an NRF network element, or may have another name. This is not limited in this application.

It may be understood that the foregoing network elements or functions may be network elements in a hardware device, software functions running on dedicated hardware, or virtualized functions instantiated on a platform (for example, a cloud platform). For ease of description, that the access management network element is an AMF, the data management network element is a UDM network element, the session management network element is an SMF network element, and the user plane network element is a UPF network element is used as an example for subsequent description in this application.

Further, the AMF network element is referred to as an AMF for short, the UDM network element is referred to as a UDM for short, the SMF network element is referred to as an SMF for short, and the UPF network element is referred to as a UPF for short. To be specific, in subsequent descriptions in this application, the AMF may be replaced by an access management network element, the UDM may be replaced by a data management network element, the SMF may be replaced by a session management network element, and the UPF may be replaced by a user plane network element.

For ease of description, in the embodiments of this application, a method for registration is described by using an example in which an apparatus is an AMF entity or a UDM entity. For an implementation method in which the apparatus is a chip in an AMF entity or a chip in a UDM entity, refer to specific descriptions about the method for registration in which the apparatus is the AMF entity or the UDM entity. Details are not described herein.

In the network architecture shown in FIG. 1, the UE is connected to the AMF through an N1 interface, the (R)AN is connected to the AMF through an N2 interface, and the (R)AN is connected to the UPF through an N3 interface. UPFs are connected to each other through an N9 interface, and the UPF is interconnected to a DN through an N6 interface. The SMF controls the UPF through an N4 interface. The AMF is connected to the SMF through an N1 interface. The AMF obtains subscription data of the UE from a UDM unit through an N8 interface. The SMF obtains the subscription data of the UE from the UDM unit through an N10 interface.

It should be understood that the foregoing network architecture applied to the embodiments of this application is merely an example, and a network architecture applicable to the embodiments of this application is not limited thereto. Any network architecture that can implement functions of the foregoing network elements is applicable to the embodiments of this application.

For example, in some network architectures, NF network elements and entities such as the AMF, the SMF network element, the PCF network element, a binding support function (BSF) network element, and the UDM network element are all referred to as NF network elements. Alternatively, in some other network architectures, a set of network elements such as the AMF, the SMF network element, the PCF network element, a BSF network element, and the UDM network element may be referred to as control plane function network elements.

The technical solutions in the embodiments of this application may be applied to various communications systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5G system, a NR system, or a future network. The 5G mobile communications system described in this application may be a non-standalone (NSA) 5G mobile communications system or a standalone (SA) 5G mobile communications system. The technical solutions provided in this application may be further applied to a future communications system, for example, a 6th generation (6G) mobile communications system. Alternatively, the communications system may be a PLMN, a device-to-device (D2D) communications system, a machine-to-machine (M2M) communications system, IoT communications system, or another communications system.

In the embodiments of this application, the UE or the access network device includes a hardware layer, an operating system layer running above the hardware layer, and an application layer running above the operating system layer. The hardware layer includes hardware such as a central processing unit (CPU), a memory management unit (MMU), or a memory (also referred to as a main memory). The operating system may be any one or more computer operating systems that implement service processing through a process. For example, the operating system is a LINUX operating system, a UNIX operating system, an ANDROID operating system, an IOS operating system, a WINDOWS operating system, or the like. The application layer includes applications, such as a browser, an address book, word processing software, and instant communications software. In addition, a specific structure of an entity for performing the method provided in the embodiments of this application is not particularly limited in the embodiments of this application, provided that a program recording code of the method provided in the embodiments of this application can be run to perform communication according to the method provided in the embodiments of this application. For example, the entity for performing the method provided in the embodiments of this application may be the UE or the access network device, or may be a functional module capable of invoking and executing the program in the UE or the access network device.

In addition, aspects or features of this application may be implemented as a method, an apparatus, or a product that uses standard programming and/or engineering technologies. The term "product" used in this application covers a computer program that can be accessed from any computer readable component, carrier or medium. For example, the computer-readable medium may include but is not limited to a magnetic storage component (for example, a hard disk, a floppy disk or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable storage media" may include but is not limited to a wireless channel, and various other media that can store, include, and/or carry an instruction and/or data.

The embodiments of this application mainly relate to the AMF, the UE, the (R)AN, the AUSF, the UDM and the NSSF in the network architecture shown in FIG. 1, and further relate to the NRF not shown in FIG. 1. For the AMF, this application relates to an initial AMF, a second AMF (old AMF), and a first AMF (target AMF).

Specifically, the second AMF in this application is an AMF that previously serves the UE, namely, an AMF that serves the UE before a current registration moment, and may also be referred to as an AMF previously accessed by the UE. The initial AMF in this application is an AMF selected by the (R)AN when the UE currently initiates a RR. The first AMF in this application is an AMF, other than the initial AMF, that is selected by the initial AMF to provide a service for the UE after the initial AMF determines to perform AMF redirection.

The AUSF in this application is mainly used for primary authentication. The UDM in this application is mainly configured to provide subscription information of the UE, and the subscription information includes network slice selection subscription data of the UE. The NSSF in this application is mainly used to provide an address list of an AMF set or AMFs that can serve requested network slice selection assistance information (NSSAI) of the UE. The NRF in this application is mainly used to provide an address of the first AMF.

For ease of description, in the embodiments of this application, an AMF key included in a NAS security context established between the UE and the second AMF is denoted as Kamf, and Kamf may also be referred to as a first key or an old key. An identifier corresponding to Kamf is denoted as a key set identifier for next generation radio access network (ngKSI), and the ngKSI is also referred to as an identifier of the first key or an identifier of the old key. The NAS security context may also be referred to as an old NAS security context.

After primary authentication is performed between the initial AMF and the UE, a key that is generated after the primary authentication and that is activated for use is denoted as Kamf_new, and a corresponding identifier of the key is denoted as ngKSI_new. Kamf_new may also be referred to as a second key, and ngKSI_new may also be referred to as an identifier of the second key.

A key generated after key derivation is performed on Kamf_new is denoted as Kamf_new', and Kamf_new' may also be referred to as a third key. Specifically, if the key generated after the key derivation is consistent with a key identifier corresponding to the derived key, a key identifier corresponding to Kamf_new' is also denoted as ngKSI_new, which is referred to as the identifier of the second key.

A key generated after key derivation is performed on Kamf is denoted as Kamf', and Kamf' may also be referred to as a fourth key. Specifically, if the key generated after the key derivation is consistent with a key identifier corresponding to the derived key, a key identifier corresponding to Kamf' is also denoted as ngKSI.

A key generated after key derivation is performed on Kamf is denoted as Kamf', and Kamf' may also be referred to as a fifth key. Specifically, if the key generated after the key derivation is consistent with a key identifier corresponding to the derived key, a key identifier corresponding to Kamf' is also denoted as ngKSI.

A key generated after key derivation is performed on Kamf' is denoted as Kamf''', and Kamf''' may also be referred to as a sixth key. Specifically, if the key generated after the key derivation is consistent with a key identifier corresponding to the derived key, a key identifier corresponding to Kamf''' is also denoted as ngKSI.

A key generated after key derivation is performed on Kamf_new' is denoted as Kamf_new'', and Kamf_new'' may also be referred to as a seventh key. Specifically, if the key generated after the key derivation is consistent with a key identifier corresponding to the derived key, a key identifier corresponding to Kamf_new'' is also denoted as ngKSI_new.

It should be understood that, the embodiments of this application impose no limitation on a derivation mechanism and a parameter that are used to perform key derivation on a key to generate a new key. However, a new key generated through key derivation cannot be used to obtain a derived key through key derivation. Alternatively, it may be referred to as that the new key is isolated from the derived key.

In a possible implementation, the key derivation in this application may be horizontal key derivation defined in an existing protocol.

In another possible implementation, the key derivation in this application may be a key derivation manner agreed on between different network elements.

It should be understood that in the embodiments of this application, a structure of a network element does not change, and only other signaling is newly added between network elements and/or an IE is added to signaling exchanged between existing network elements, to achieve an objective that needs to be achieved in a registration procedure during AMF redirection provided in the embodiments of this application.

Figure 2:
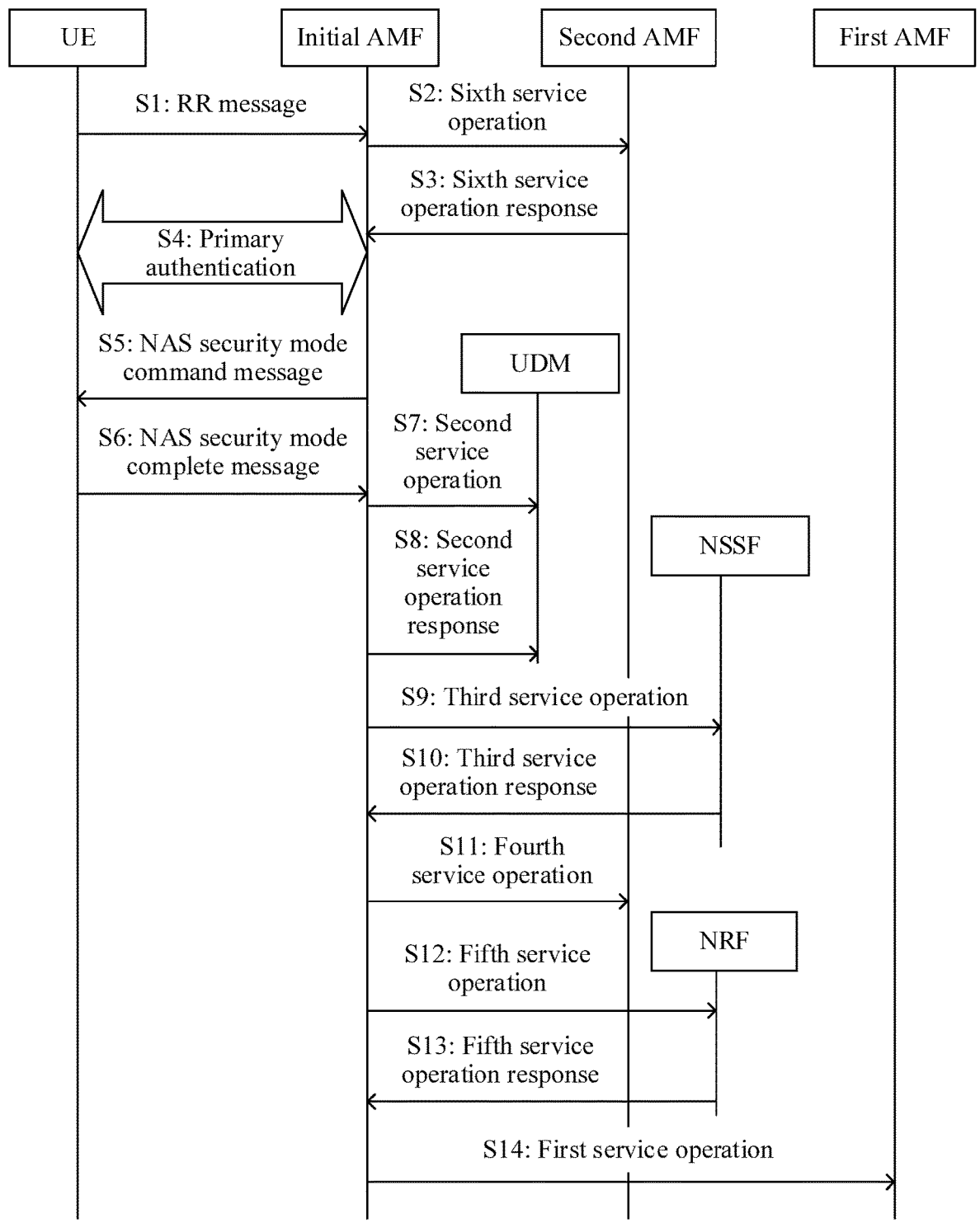
FIG. 2 is a schematic diagram of a registration procedure during AMF redirection.

First, to facilitate understanding of a method in a registration procedure during AMF redirection according to an embodiment of this application, the following briefly describes, with reference to FIG. 2, a scenario in which a registration failure may occur in the registration procedure during AMF redirection and that is defined in an existing protocol. FIG. 2 is a schematic diagram of a registration procedure during AMF redirection. Execution bodies include UE, an initial AMF, a second AMF, a first AMF, a UDM, an NSSF, and an NRF.

The registration procedure during AMF redirection includes the following steps.

S1 the UE sends a RR message to the initial AMF, where the RR message carries a 5G-GUTI or an SUCI of the UE.

It should be understood that, in this embodiment of this application, that the UE sends the RR message to the initial AMF indicates that the UE sends the RR message to a (R)AN, and then the (R)AN sends the RR message to the initial AMF. Because the (R)AN plays a role of transparent transmission in this step, for brevity of description, in this embodiment of this application and the accompanying drawing, it directly describes that the UE sends the RR message to the initial AMF.

In a possible implementation, if the UE does not have a NAS security context, the UE should include a plain IE(s) in the RR message, and the plain IE(s) does/do not include requested NSSAI of the UE.

In another possible implementation, if the UE has a NAS security context, the UE should include a plaint IE(s) and a NAS container in the RR message. The NAS container includes the complete RR message, and the complete RR message includes the requested NSSAI of the UE.

Optionally, if the RR message received by the initial AMF carries the 5G-GUTI of the UE, the initial AMF requests a UE context from the second AMF. In other words, the registration procedure shown in FIG. 2 further includes S2 the initial AMF invokes a sixth service operation on the second AMF. Specifically, after the initial AMF receives the RR message sent by the UE, the initial AMF determines, based on the 5G-GUTI in the RR message, the second AMF that previously serves the UE, and invokes the sixth service operation on the second AMF. The sixth service operation may be referred to as Namf_Communication_UEContext-Transfer, and is used to request to obtain the UE context from the second AMF. The UE context includes the NAS security context of the UE, and the NAS security context of the UE includes an AMF key established between the UE and the second AMF and an identifier corresponding to the AMF key.

S3 the second AMF sends a sixth service operation response to the initial AMF, where the sixth service operation response includes the UE context.

Specifically, after the UE is successfully authenticated by the second AMF, the second AMF sends the sixth service operation response to the initial AMF. Authentication of the UE by the second AMF means verification of integrity protection for the RR message. The sixth service operation response may be referred to as Namf_Communication_UE-ContextTransfer Response. Specifically, the sixth service operation response includes Kamf or Kamf', and a key identifier ngKSI corresponding to Kamf or Kamf'.

It should be understood that verification of integrity protection for a message in this embodiment of this application includes obtaining, by a message receiver, a message authentication code through computation of a received message by using an agreed algorithm (and key), and comparing the message authentication code that is obtained through computation with the received message authentication code.

The UE context included in the sixth service operation response includes the following security-related contexts.

(1) The sixth service operation response includes Kamf and ngKSI.

Specifically, that the sixth service operation response includes Kamf means that the second AMF directly notifies the initial AMF of the sixth service operation response that includes the AMF key used between the UE and the second AMF.

The key identifier corresponding to Kamf is denoted as ngKSI. The key and the key identifier may be collectively referred to as key information. The sixth service operation response message may further carry ngKSI.

(2) The sixth service operation response includes Kamf' and ngKSI.

That the sixth service operation response includes Kamf' means that the second AMF performs horizontal KAMF derivation on the key Kamf used between the UE and the second AMF, to generate a new key, which is denoted as Kamf'. It should be understood that a manner in which the second AMF obtains Kamf' is not limited in this embodiment of this application. Kamf' may be obtained by using a horizontal KAMF derivation method specified in an existing protocol, or may be obtained by using another agreed derivation algorithm and parameter. Details are not described in this application.

The key identifier corresponding to Kamf' is denoted as ngKSI. The sixth service operation response message may further carry ngKSI.

Specifically, in this case, the sixth service operation response further includes a key derivation indication. The key derivation indication is used to indicate that the second AMF performs key derivation on the key Kamf' included in the sixth service operation response. The key derivation indication may be referred to as an keyAMFHDerivationInd.

(3) When the UE context locally stored in the second AMF includes an uplink NAS count (NAS COUNT) value and/or a downlink NAS COUNT value, the sixth service operation response may further include the uplink NAS COUNT value and/or the downlink NAS COUNT value.

(4) When the second AMF locally stores an integrity protection algorithm and/or an encryption algorithm used by the UE and the second AMF, the sixth service operation response may further include the integrity protection algorithm and/or the encryption algorithm.

(5) When the second AMF locally stores UE security capabilities, the sixth service operation response may further include the UE security capabilities. The UE security capabilities include the integrity protection algorithm and/or the encryption algorithm implemented on the UE.

Optionally, if the RR message received by the initial AMF carries the SUCI of the UE, the initial AMF initiates a primary authentication procedure.

Alternatively/in addition, if the RR message received by the initial AMF carries the 5G-GUTI of the UE, but the initial AMF fails to obtain the UE context from the second AMF, the initial AMF initiates a primary authentication procedure.

Alternatively/in addition, if the RR message received by the initial AMF carries the 5G-GUTI of the UE, and the initial AMF successfully obtains the UE context from the second AMF, the initial AMF determines, according to a local policy, that a primary authentication procedure needs to be initiated. In other words, the registration procedure shown in FIG. 2 further includes S4 the initial AMF initiates the primary authentication procedure. In this case, both the UE and the initial AMF obtain Kamf_new and an identifier ngKSI_new corresponding to Kamf_new.

Specifically, when the initial AMF initiates the primary authentication procedure, to use Kamf_new generated through primary authentication as the AMF key on the UE side, the initial AMF initiates a NAS SMC message.

Alternatively/in addition, if the second AMF performs key derivation, the sixth service operation response includes keyAMFHDerivationInd, Kamf', and ngKSI, and the initial AMF needs to initiate the NAS SMC procedure.

Alternatively/in addition, if the second AMF does not perform key derivation, the sixth service operation response includes Kamf, or Kamf and ngKSI. The initial AMF determines to use Kamf and ngKSI, but the initial AMF selects a new security algorithm. Therefore, the initial AMF needs to initiate the foregoing NAS SMC procedure.

In other words, the registration procedure shown in FIG. 2 may further include S5 the initial AMF sends a NAS SMC message to the UE. Unless otherwise specified, the NAS SMC message in the following description is the NAS SMC message and special description is required.

Optionally, the NAS SMC message carries an indication for requesting a complete initial NAS message. Because this application mainly relates to the registration procedure of the UE, the indication for requesting the complete initial NAS message is an indication for requesting a complete RR message. When no special explanation is provided below, the indication for requesting the complete initial NAS message refers to the indication for requesting the complete RR message.

S6 the UE sends a NAS security mode complete (NAS SMP) message to the initial AMF.

Optionally, the UE adds the complete initial NAS message to the NAS security mode complete message based on the indication, in the NAS SMC message, for requesting the complete initial NAS message. In this embodiment of this application, the complete initial NAS message mainly refers to the complete RR message.

The complete initial NAS message carries the requested NSSAI.

Optionally, if the initial AMF needs subscription information of the UE to determine whether to perform AMF redirection, but the second AMF does not provide the slice selection subscription information of the UE, the initial AMF needs to obtain the slice selection subscription information of the UE from the UDM. In other words, the registration procedure shown in FIG. 2 further includes S7 the initial AMF invokes a second service operation of the UDM. The second service operation may be referred to as an Nudm_SDM_Get service operation, and is used to request to obtain the slice selection subscription information of the UE from the UDM.

S8 the UDM sends a second service operation response to the initial AMF, where the second service operation response includes the slice selection subscription information of the UE.

Optionally, if the initial AMF needs to perform slice selection (for example, the initial AMF cannot serve some or all of single-NSSAI (S-NSSAI) in the requested NSSAI of the UE), the initial AMF needs to obtain, from the NSSF, information about an AMF that can serve the requested NSSAI of the UE.

In other words, the registration procedure shown in FIG. 2 may further include S9 the initial AMF invokes a third service operation of the NSSF. The third service operation may be referred to as an Nnssf_NSSelection_Get service, and is used to request to obtain, from the NSSF, the information about the AMF that serves the requested NSSAI of the UE.

S10 the NSSF sends a third service operation response to the initial AMF, where the third service operation response includes the slice selection subscription information of the UE.

After the initial AMF determines that AMF redirection needs to be performed, the initial AMF determines to reroute the RR message to the first AMF. In other words, the registration procedure shown in FIG. 2 further includes S11 the initial AMF invokes a fourth service operation on the second AMF. The fourth service operation indicates that registration of the UE at the initial AMF fails.

Specifically, the fourth service operation may be referred to as Namf_Communication_RegistrationStatusUpdate, and a registration status of the UE carried in the fourth service operation is "NOT_TRANSFERRED". After receiving an invocation of the second service operation from the initial AMF, the second AMF ignores an invocation of Namf_Communication_UEContextTransfer from the initial AMF in S2.

Optionally, if the initial AMF determines to perform NAS rerouting (direct NAS reroute or reroute NAS via (R)AN) and the initial AMF does not have an address of the first AMF, the initial AMF needs to obtain the address of the first AMF from the NRF. In other words, the registration procedure shown in FIG. 2 further includes S12 the initial AMF invokes a fifth service operation from the NRF. The fifth service operation may be referred to as an Nnrf_NFDiscovery_Request service operation, and is used to obtain the address of the first AMF.

S13 the NRF sends a fifth service operation response to the initial AMF, where the fifth service operation response includes the address of the first AMF.

Optionally, if the initial AMF determines, based on the local policy and the subscription information of the UE, to directly forward the NAS message (namely, the RR message) to the first AMF (that is, direct NAS reroute), the initial AMF needs to send the complete RR message and the UE context to the first AMF.

In other words, the registration procedure shown in FIG. 2 may further include S14 the initial AMF invokes a first service operation to the first AMF. The first service operation may be referred to as an Namf_Communication_N1MessageNotify service operation, and is used to send the complete RR message and/or the UE context to the first AMF. The UE context includes a NAS security-related context of the UE. For ease of description, the security-related context of the UE in the following is briefly referred to as the NAS security context of the UE.

Before the initial AMF invokes the first service operation to the first AMF, the initial AMF determines, according to the local policy, whether to perform horizontal KAMF derivation. If the initial AMF does not perform horizontal KAMF derivation according to the local policy, the initial AMF sends a current security context to the first AMF. If the initial AMF performs horizontal KAMF derivation according to the local policy, the initial AMF generates a new KAMF, a new security context, or a new NAS security context based on a current KAMF. Then, the initial AMF sends the new KAMF, the new security context, or the new NAS security context to the first AMF, and sends a horizontal KAMF derivation indication to the first AMF. The horizontal KAMF derivation indication may be referred to as keyAmfHDerivationInd.

The initial AMF sends the current security context, the new KAMF, the new security context, or the horizontal KAMF derivation indication in the first service operation.

In this application, the current security context includes a current NAS security context. The current NAS security context includes the current KAMF. The initial AMF generates a new KAMF based on the current KAMF, and the new KAMF is also referred to as a derived KAMF. The initial AMF generates a new security context based on the current KAMF, and the new security context is also referred to as a derived security context. The initial AMF generates a new NAS security context based on the current KAMF, and the new NAS security context is also referred to as a derived NAS security context and includes the derived KAMF. The new security context generated by the initial AMF based on the current KAMF includes the new NAS security context generated by the initial AMF based on the current KAMF. The horizontal KAMF derivation indication is also referred to as a KAMF horizontal derivation indication, and is used to indicate to generate a new KAMF or to perform horizontal KAMF derivation.

Specifically, in the registration procedure shown in FIG. 2, it can be learned from the descriptions of step S14 that, after the first AMF receives the first service operation, a first N1 message sent by the first AMF to the UE includes the following several possibilities.

Possibility 1. If the first AMF determines to initiate the primary authentication (for example, the first AMF does not receive the NAS security context of the UE, or the first AMF receives the NAS context of the UE but determines not to use the received KAMF), the first AMF sends an authentication request message to the UE.

Possibility 2. If the first service operation carries the UE context, and the first AMF determines to use the received KAMF but selects a new encryption and/or integrity protection algorithm, or the first AMF receives the horizontal KAMF derivation indication, the first AMF sends the NAS SMC message to the UE.

Possibility 3. If the first service operation carries the UE context, and the first AMF determines to use the received key and the received encryption and/or integrity protection algorithm (a security algorithm used between the UE and the second AMF), the first AMF sends another N1 message to the UE.

In a case of Possibility 1, the authentication request message sent by the first AMF to the UE may be discarded by the UE. For example, before the initial AMF sends the first service operation to the first AMF, if the initial AMF and the UE have established a new NAS security context, or the initial AMF and the UE have successfully performed a NAS SMC, or the initial AMF and the UE have activated NAS security protection, or the initial AMF and the UE have securely exchanged the NAS message, the UE may discard and does not process the authentication request message sent by the first AMF to the UE. This is because the UE and the initial AMF have established the new NAS security context through the NAS SMC procedure. In this case, the UE processes only the N1 message protected by the new NAS security context or the NAS SMC message. However, in the case in which the first AMF determines to perform primary authentication, when the first AMF sends the authentication request message to the UE, the UE receives the unprotected authentication request message, because the current protocol does not define that the authentication request message needs to be protected. Then, the UE discards the unprotected authentication request message. Consequently, the registration fails.

In addition, to facilitate understanding of the embodiments of this application, the following several descriptions are provided.

First, in this application, "used to indicate" may include "used to directly indicate" and "used to indirectly indicate". When that indication information is used to indicate A is described, it may be described that the indication information may be used to directly or indirectly indicate A, but it does not necessarily indicate that the indication information carries A.

Information that is to be indicated by the indication information is referred to as to-be-indicated information. In a specific implementation process, there are a plurality of manners for indicating the to-be-indicated information. For example, the to-be-indicated information may be directly indicated, for example, the to-be-indicated information or an index of the to-be-indicated information may be used to indicate the to-be-indicated information. The manner for indicating the to-be-indicated information is not limited. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or agreed on in advance. For example, specific information may also be indicated by using a pre-agreed (for example, stipulated in a protocol) arrangement sequence of various pieces of information, to reduce indication overheads to some extent. In addition, a common part of all pieces of information may be further identified and indicated in a unified manner, to reduce indication overheads caused by separately indicating same information.

Second, "first", "second", and various numerical numbers (for example, "#1", and "#2") shown in this application are merely for ease of description, and are used to distinguish between objects, but are not intended to limit the scope of the embodiments of this application. For example, different numerical numbers "first" and "second" are used to distinguish between a second AMF and a first AMF rather than describe a specific order or sequence. It should be understood that the objects described in this way are interchangeable in a proper circumstance, so that a solution other than the embodiments of this application can be described.

Third, in this application, "preset" may include "predefined", for example, defined in a protocol. "Predefined" may be implemented by pre-storing corresponding code or a corresponding table in a device (for example, a UE or an access network device) or in another manner that can be used to indicate related information. A specific implementation of "predefined" is not limited in this application.

Fourth, "store" in the embodiments of this application may be storage in one or more memories. The one or more memories may be separately disposed, or may be integrated into an encoder or a decoder, a processor, or a communications apparatus. Alternatively, a part of the one or more memories may be separately disposed, and a part of the one or more memories are integrated into a decoder, a processor, or a communications apparatus. The memory may be a storage medium in any form. This is not limited in this application.

Fifth, the "protocol" in the embodiments of this application may be a standard protocol in the communications field, for example, may include an LTE protocol, a NR protocol, and a related protocol applied to a future communications system. This is not limited in this application.

Sixth, for ease of understanding, main parameters used in the following embodiments of this application are briefly described.

Kamf is an AMF key included in a NAS security context established between UE and the second AMF.

Kamf' is an AMF key generated after key derivation is performed on Kamf.

KAMF is an AMF key, and may be used to indicate Kamf, Kamf', or another AMF key.

To resolve a problem that registration may fail in the registration procedure shown in FIG. 2, this application provides a method for registration. According to the method, a first AMF sends a protected authentication request message, to prevent UE from discarding the authentication request message, and increase a probability of successful registration. The following describes in detail, with reference to the accompanying drawings, the method for registration provided in the embodiments of this application.

It should be understood that the method provided in the embodiments of this application may be applied to the network architecture shown in FIG. 1, and may be specifically applied to a scenario of AMF redirection.

It should be further understood that, a specific structure of an entity for performing the method provided in the embodiments of this application is not particularly limited in the following embodiments, provided that a program recording code of the method provided in the embodiments of this application can be run to perform communication according to the method provided in the embodiments of this application. For example, the entity for performing the method provided in the embodiments of this application may be the UE or an access network device, or may be a functional module capable of invoking and executing the program in the UE or the access network device.

To cover general cases, an example in which the UE interacts with a network device is used to describe in detail the method for registration provided in the embodiments of this application. The network device includes an access network device and a CN device.

Figure 3A:
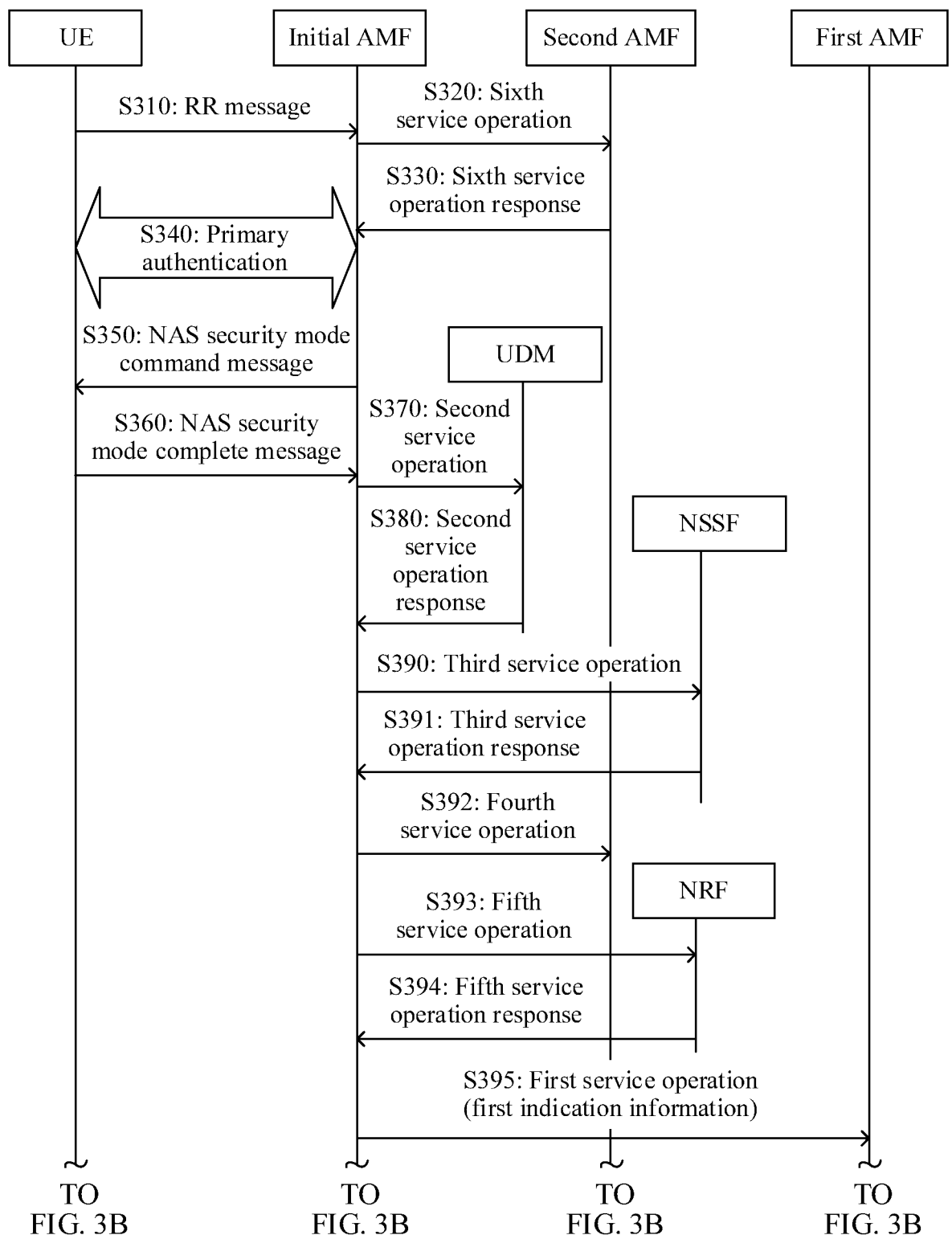
FIG. 3A and FIG. 3B are a schematic flowchart of a method for registration according to an embodiment of this application.
Figure 3B:
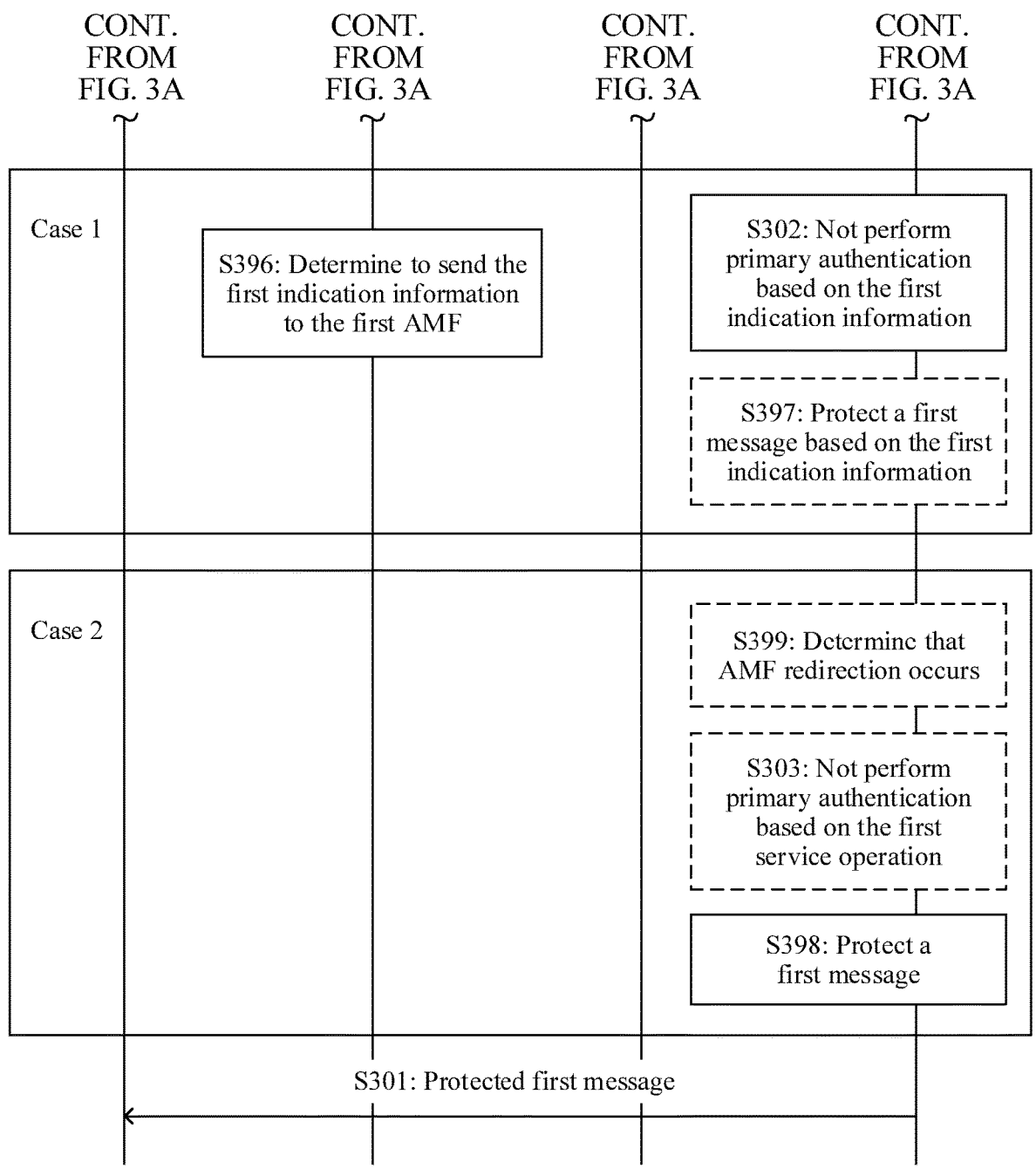

FIG. 3A and FIG. 3B are a schematic flowchart of a method for registration according to an embodiment of this application. Execution bodies include UE, an initial AMF, a second AMF, a first AMF, a UDM, an NSSF, and an NRF.

The method for registration includes some or all of the following steps.

S310 the UE sends an RR message to the initial AMF. This is similar to S1 in FIG. 2, and details are not described herein again.

Optionally, if the RR message received by the initial AMF carries a 5G-GUTI of the UE, the initial AMF requests a UE context from the second AMF.

In other words, the registration procedure shown in FIG. 3A may further include S320 the initial AMF invokes a sixth service operation on the second AMF. This is similar to S2 in FIG. 2, and details are not described herein again.

S330 the second AMF sends a sixth service operation response to the initial AMF. This is similar to S3 in FIG. 2, and details are not described herein again.

Optionally, when the initial AMF determines to initiate a primary authentication procedure, the registration procedure shown in FIG. 3A further includes S340 the initial AMF initiates the primary authentication procedure. This is similar to S4 in FIG. 2, and details are not described herein again.

S350 the initial AMF sends a NAS SMC message to the UE. This is similar to S5 in FIG. 2, and details are not described herein again.

S360 the UE sends a NAS SMP message to the initial AMF. This is similar to S6 in FIG. 2, and details are not described herein again.

S370 the initial AMF invokes a second service operation from the UDM. This is similar to S7 in FIG. 2, and details are not described herein again.

S380 the UDM sends a second service operation response to the initial AMF. This is similar to S8 in FIG. 2, and details are not described herein again.

S390 the initial AMF invokes a third service operation from the NSSF. This is similar to S9 in FIG. 2, and details are not described herein again.

S391 the NSSF sends a third service operation response to the initial AMF. This is similar to S10 in FIG. 2, and details are not described herein again.

S392 the initial AMF invokes a fourth service operation on the second AMF. This is similar to S1 in FIG. 2, and details are not described herein again.

S393 the initial AMF invokes a fifth service operation from the NRF. This is similar to S12 in FIG. 2, and details are not described herein again.

S394 the NRF sends a fifth service operation response to the initial AMF. This is similar to S13 in FIG. 2, and details are not described herein again.

S395 the initial AMF invokes a first service operation to the first AMF, where the first service operation is used to indicate that AMF redirection occurs.

Different from the registration procedure shown in FIG. 2, in this embodiment, after the first AMF receives the first service operation, the first AMF protects a first message, or the first AMF does not perform primary authentication.

Specifically, that the first AMF protects the first message, or the first AMF does not perform primary authentication includes the following two cases.

Case 1. The first AMF receives first indication information.

In a possible implementation, the first indication information is used to indicate the first AMF to protect the first message. In this implementation, the first AMF determines, based on the first indication information, that the first message should be protected.

In a possible implementation, the first indication information is used to indicate the first AMF to use a received KAMF, or indicate the first AMF to use a received security context, or indicate the first AMF not to perform primary authentication, or indicate the first AMF to skip the primary authentication procedure and perform another procedure in registration. In this implementation, the first AMF does not perform primary authentication, or the first AMF uses the received KAMF, or the first AMF skips primary authentication and performs another procedure in a registration procedure. In this implementation, the first AMF still protects an N1 message by using a received NAS security context.

The first message is an authentication request message, or the first message is the N1 message, or the first message is the N1 message other than the NAS SMC message.

It should be understood that the method for registration provided in this embodiment of this application is mainly used to prevent the UE from discarding the unprotected authentication request message sent by the first AMF and therefore avoid a registration failure during AMF redirection. Therefore, it may be understood that the first message includes only the authentication request message, and another message may also be included in the first message. The other message is not necessarily limited to the N1 message. In this embodiment of this application, that the first message includes the authentication request message is understood as that the first message may be the authentication request message.

In a possible implementation, the first indication information is carried in the first service operation. In other words, an IE is newly added to the first service operation shown in FIG. 2, and the newly added IE is the first indication information.

In another possible implementation, the first indication information is newly added signaling between the initial AMF and the first AMF, and is sent to the first AMF before the first AMF sends the first message.

From a perspective of reducing signaling overheads, the first indication information may be carried in the first service operation and sent to the first AMF. This is equivalent to adding the IE to original signaling between the initial AMF and the first AMF. In this way, there is no need to add a piece of signaling.

In Case 1, before the initial AMF sends the first indication information to the first AMF, the initial AMF determines that the first indication information needs to be sent to the first AMF. In other words, the method procedure shown in FIG. 3B further includes S396 the initial AMF determines to send the first indication information to the first AMF.

Specifically, when a first preset condition is met, the initial AMF sends the first indication information to the first AMF. Correspondingly, the first AMF receives the first indication information.

The first preset condition is any one or more of the following conditions.

The initial AMF and the UE have securely exchanged a NAS message, the initial AMF and the UE have successfully performed a NAS SMC, the UE and the initial AMF have established a security association, the UE and the initial AMF have activated security protection, the UE and the initial AMF have established a new NAS security context, the initial AMF has performed horizontal KAMF derivation, the UE and initial AMF have performed primary authentication, the initial AMF selects a security algorithm different from a security algorithm selected by the second AMF, or the initial AMF uses a KAMF that is generated after horizontal KAMF derivation and that is received from the second AMF.

When the first preset condition is not met, the initial AMF does not send the first indication information to the first AMF. Correspondingly, the first AMF does not receive the first information indication.

In a possible implementation, if the first AMF does not receive the first indication information, the first AMF determines, according to a local policy, whether to perform primary authentication. If the first AMF determines to perform primary authentication, the first AMF sends the unprotected authentication request message, or the first AMF protects the authentication request message by using the received security context, and sends the protected authentication request message.

Further, the first indication information may be used to indicate at least one of the following cases.

The initial AMF and the UE have securely exchanged the NAS messages, the UE and the initial AMF have established a security association, the UE and the initial AMF have activated security protection, the UE and the initial AMF have established the new NAS security context, the initial AMF and the UE have successfully performed a NAS SMC procedure, the first AMF should protect the first message by using the received NAS security context, the first AMF does not perform the primary authentication procedure, the first AMF skips the primary authentication procedure and performs another procedure in registration, or the first AMF uses the received KAMF.

Specifically, a UE context in the first service operation includes the NAS security context. The NAS security context may be a NAS security context obtained after horizontal derivation.

After the first AMF receives the first indication information, the method procedure shown in FIG. 3B further includes S397 the first AMF protects the first message based on the first indication information. In addition, the first AMF sends the protected first message to the UE. The method procedure shown in FIG. 3B further includes S301 the first AMF sends the protected first message to the UE.

Optionally, when the first indication information is used to indicate the first AMF to use the received KAMF, or indicate the first AMF not to perform the primary authentication procedure, or indicate the first AMF to skip the primary authentication procedure and perform another procedure in registration, the method procedure shown in FIG. 3B may further include the following step S302 the first AMF does not perform primary authentication based on the first indication information. Alternatively, it may be described as that the first AMF skips, based on the first indication information, primary authentication and performs another procedure in registration, or the first AMF uses the received KAMF. The first AMF still protects the N1 message by using the received NAS security context.

Specifically, that the first AMF protects the first message based on the first indication information includes any one of the following possible implementations.

When the first AMF determines to initiate primary authentication according to the local policy, the first AMF protects the authentication request message by using the received NAS security context, or the first AMF protects the authentication request message by using the received KAMF and a received security algorithm, or the first AMF computes a NAS key by using the received KAMF and a received security algorithm, and protects the authentication request message by using the NAS key obtained through computation and the received algorithm.

When the first AMF determines, based on the first indication information, not to perform primary authentication or to skip primary authentication, the first AMF protects the N1 message by using the received NAS security context or the received KAMF.

When the first AMF determines to use the received KAMF according to the local policy, the first AMF should protect the N1 message by using the received NAS security context, or the first AMF protects the N1 message other than the NAS SMC message by using the received NAS security context, or the first AMF protects the N1 message by using the received KAMF and a received security algorithm, or the first AMF protects the N1 message other than the NAS SMC message by using the received KAMF and a received security algorithm, or the first AMF computes a NAS key by using the received KAMF and a received security algorithm, and protects the N1 message by using the NAS key obtained through computation and the received algorithm, or the first AMF computes a NAS key by using the received KAMF and a received security algorithm, and protects the N1 message other than the NAS SMC message by using the NAS key obtained through computation and the received algorithm.

Case 2. After the first AMF receives the first service operation, the first AMF may also protect the first message.

In a possible implementation, the first AMF protects the first message based on the received first service operation.

In a possible implementation, the first AMF determines, based on the received first service operation, whether AMF redirection occurs, and protects the first message if the redirection occurs.

In a possible implementation, based on the received first service operation, the first AMF uses a received KAMF, or does not perform primary authentication, or skips primary authentication and performs another procedure in the registration procedure. In this implementation, the first AMF still protects an N1 message by using a received NAS security context.

In a possible implementation, the first AMF determines, based on the received first service operation, whether AMF redirection occurs. If AMF redirection occurs, the first AMF uses a received KAMF, or does not perform primary authentication, or skips primary authentication and perform another procedure in the registration procedure. In this implementation, the first AMF still protects an N1 message by using a received NAS security context.

The first AMF determines, based on a registration context container IE (registrationCtxtContainer IE) carried in the first service operation, that AMF redirection occurs, and/or the first AMF determines, based on a fact that a type of the N1 message notified in the first service operation is 5GMM, that AMF redirection occurs.

In Case 2, the method procedure shown in FIG. 3B further includes S398 the first AMF protects the first message. In addition, the first AMF sends the protected first message to the UE. The method procedure shown in FIG. 3B further includes S301 the first AMF sends the protected first message to the UE.

Optionally, it is assumed that based on the received first service operation, the first AMF uses the received KAMF, or does not perform the primary authentication, or skips the primary authentication. In this case, the method procedure shown in FIG. 3B may further include the following step S303 the first AMF does not perform the primary authentication based on the first service operation. Alternatively, it may be described as that based on the first service operation, the first AMF skips the primary authentication and performs another procedure in registration, or the first AMF uses the received KAMF. In addition, the first AMF still protects the N1 message by using the received NAS security context.

Specifically, that the first AMF protects the first message includes any one of the following possible implementations.

When the first AMF determines to initiate the primary authentication according to a local policy, the first AMF protects an authentication request message by using the received KAMF, or the first AMF protects an authentication request message by using the received NAS security context, or the first AMF protects an authentication request message by using the received KAMF and a received security algorithm, or the first AMF computes a NAS key by using the received KAMF and a received security algorithm, and protects an authentication request message by using the NAS key obtained through computation and the received algorithm.

When the first AMF determines, based on the first service operation, not to perform the primary authentication or to skip the primary authentication, the first AMF protects, by using the received NAS security context or the received KAMF, the NAS SMC message or another N1 message that is to be sent to the UE.

When the first AMF determines not to initiate the primary authentication according to the local policy, that is, when the first AMF sends the NAS SMC message or another N1 message to the UE, the first AMF protects the N1 message by using the received NAS security context, or the first AMF protects the N1 message other than the NAS SMC message by using the received NAS security context, or the first AMF protects the N1 message by using the received KAMF and a received security algorithm, or the first AMF protects the N1 message other than the NAS SMC message by using the received KAMF and a received security algorithm, or the first AMF computes a NAS key by using the received KAMF and a received security algorithm, and protects the N1 message by using the NAS key obtained through computation and the received algorithm, or the first AMF computes a NAS key by using the received KAMF and a received security algorithm, and protects the N1 message other than the NAS SMC message by using the NAS key obtained through computation and the received algorithm.

In a possible implementation, after receiving the first service operation, the first AMF determines that AMF redirection occurs, and then the first AMF protects the first message. In this case, the method procedure shown in FIG. 3B further includes S399 the first AMF determines that AMF redirection occurs.

Optionally, the first AMF may determine, based on the IE(s) carried in the first service operation, whether AMF redirection occurs. For example, if the type of the N1 message carried in the first service operation includes 5GMM, the first AMF determines that AMF redirection occurs. For another example, if the first service operation carries the registration context container type IE, the first AMF determines that AMF redirection occurs.

In a possible implementation, after determining that AMF redirection occurs, the first AMF may skip the primary authentication procedure and perform another procedure in registration. In other words, after determining that AMF redirection occurs, the first AMF may not perform the primary authentication, and the first AMF protects the first message by using the received NAS security context, or the first AMF uses the received KAMF.

It should be understood that the foregoing case in which the first AMF determines that AMF redirection occurs is merely an example, and constitutes no limitation on the protection scope of this application. For details, refer to a stipulation about determining whether AMF redirection occurs in a current protocol or a future protocol. Details are not described herein.

In the method procedure shown in FIG. 3A and FIG. 3B, the first AMF sends the protected authentication request message. This prevents the UE from discarding the received unprotected authentication request message.

Figure 4:
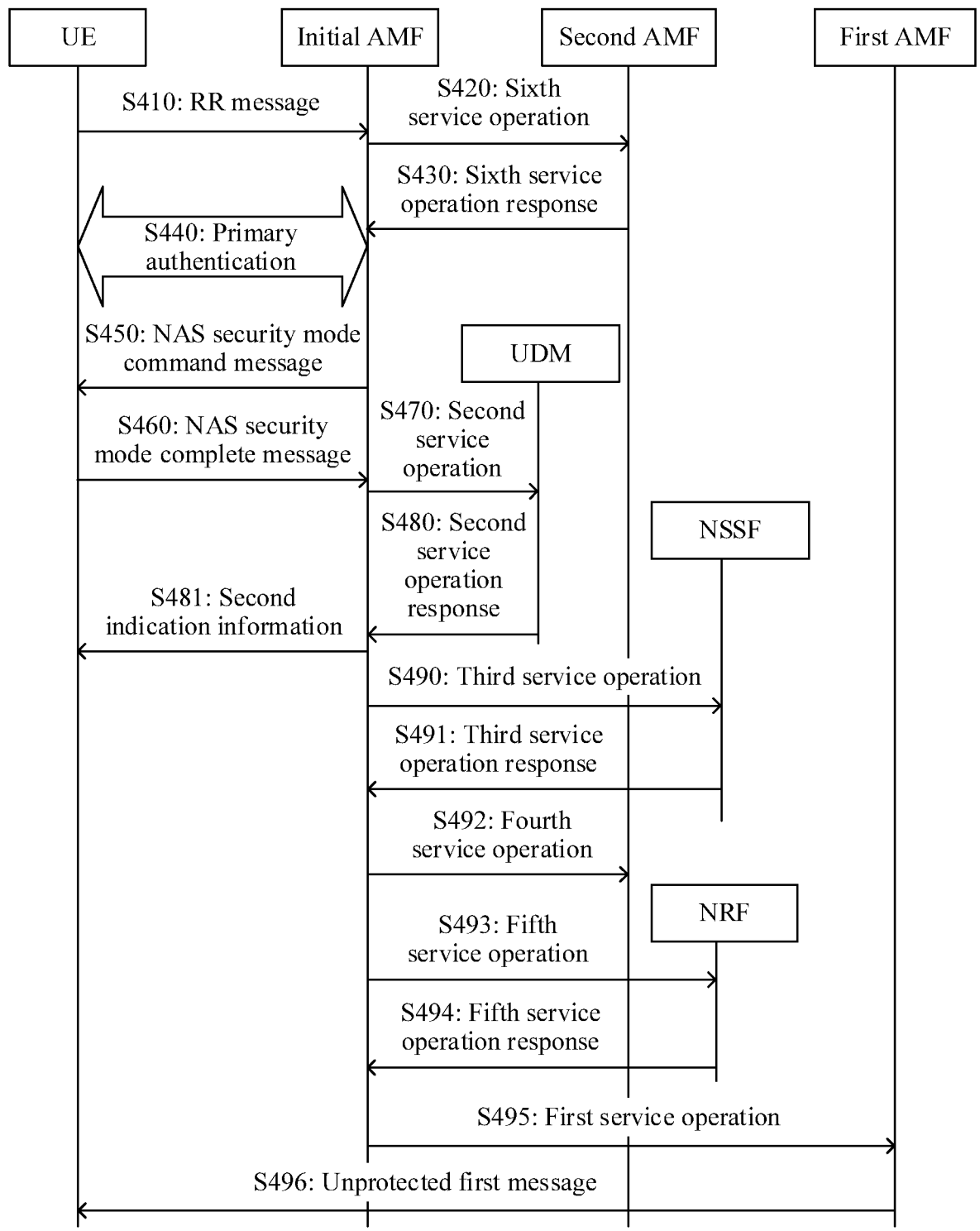
FIG. 4 is a schematic flowchart of another method for registration according to an embodiment of this application.

FIG. 4 is a schematic flowchart of another method for registration according to an embodiment of this application. Execution bodies include UE, an (R)AN, an initial AMF, a second AMF, a first AMF, a UDM, an NSSF, and an NRF.

The method for registration includes some or all of the following steps.

S410 the UE sends an RR message to the initial AMF. This is similar to S1 in FIG. 2, and details are not described herein again.

Optionally, if the RR message received by the initial AMF carries a 5G-GUTI of the UE, the initial AMF requests a UE context from the second AMF. In other words, the registration procedure shown in FIG. 4 further includes S420 the initial AMF invokes a sixth service operation on the second AMF. This is similar to S2 in FIG. 2, and details are not described herein again.

S430 the second AMF sends a sixth service operation response to the initial AMF. This is similar to S3 in FIG. 2, and details are not described herein again.

Optionally, when the initial AMF determines to initiate a primary authentication procedure, the registration procedure shown in FIG. 4 further includes S440 the initial AMF initiates the primary authentication procedure. This is similar to S4 in FIG. 2, and details are not described herein again.

S450 the initial AMF sends a NAS SMC message to the UE. This is similar to S5 in FIG. 2, and details are not described herein again.

S460 the UE sends a NAS SMP message to the initial AMF. This is similar to S6 in FIG. 2, and details are not described herein again.

S470 the initial AMF invokes a second service operation from the UDM. This is similar to S7 in FIG. 2, and details are not described herein again.

S480 the UDM sends a second service operation response to the initial AMF. This is similar to S8 in FIG. 2, and details are not described herein again.

Different from the registration procedure shown in FIG. 2, according to the method procedure for registration shown in FIG. 4, the initial AMF determines to send second indication information to the UE, to indicate the UE to accept an unprotected authentication request message. This avoids that the UE discards the unprotected authentication request message sent by the first AMF in the registration procedure shown in FIG. 2. In this case, the registration procedure shown in FIG. 4 further includes S481 the initial AMF sends the second indication information to the UE. That the second indication information is used to indicate the UE to accept the unprotected authentication request message may also be understood as that the second indication information is used to indicate the UE to process the unprotected authentication request message, or may be understood as that the second indication information is used to indicate the UE not to discard the unprotected authentication request message.

That the initial AMF determines to send the second indication information to the UE includes determining, by the initial AMF based on a second preset condition, to send the second indication information to the UE. In other words, when at least one of the following second preset conditions is met, the initial AMF determines to send the second indication information to the UE.

The initial AMF determines to initiate AMF redirection, the initial AMF determines to initiate AMF redirection through a (R)AN, the initial AMF and UE have securely exchanged a NAS messages before AMF redirection, the initial AMF and UE have successfully performed a NAS SMC before AMF redirection, the UE and the initial AMF have established a security association before AMF redirection, the UE and the initial AMF have activated security protection before AMF redirection, the UE and the initial AMF have established a new NAS security context before AMF redirection, the UE and initial AMF have performed primary authentication before AMF redirection, the initial AMF selects, before AMF redirection, a security algorithm different from a security algorithm selected by the second AMF, or the initial AMF uses, before AMF redirection, a KAMF that is generated after horizontal KAMF derivation and that is received from the second AMF.

It should be understood that, in this application, how the initial AMF sends the second indication information to the UE is not limited. The second indication information may be added to an existing message. Alternatively, the second indication information may be included in a newly added piece of signaling for transmission.

For example, that the initial AMF sends the second indication information may be that the initial AMF sends an N1 message to the UE, where the N1 message is used to indicate the UE to receive the unprotected authentication request message. For another example, that the initial AMF sends the second indication information may be that the initial AMF sends an N1 message (for example, a configuration update command message, the NAS SMC message, a 5GMM status message, or a downlink NAS transport message) to the UE, where the N1 message carries the second indication information.

Similar to the registration procedure shown in FIG. 2, the method for registration procedure shown in FIG. 4 should further include S490 the initial AMF invokes a third service operation from the NSSF. This is similar to S9 in FIG. 2, and details are not described herein again.

S491 the NSSF sends a third service operation response to the initial AMF. This is similar to S10 in FIG. 2, and details are not described herein again.

S492 the initial AMF invokes a fourth service operation on the second AMF. This is similar to S11 in FIG. 2, and details are not described herein again.

S493 the initial AMF invokes a fifth service operation from the NRF. This is similar to S12 in FIG. 2, and details are not described herein again.

S494 the NRF sends a fifth service operation response to the initial AMF. This is similar to S13 in FIG. 2, and details are not described herein again.

S495 the initial AMF invokes a first service operation to the first AMF. This is similar to S14 in FIG. 2, and details are not described herein again.

It should be understood that S481 may be performed at any time after step S460 and before S493.

Specifically, different from the registration procedure shown in FIG. 2, according to the method procedure for registration shown in FIG. 4, the UE receives the second indication information in advance. Therefore, after S495, when the UE receives the unprotected authentication request message sent by the first AMF, the UE does not discard the authentication request message. The method procedure for registration shown in FIG. 4 should further include S496 the UE receives an unprotected first message from the first AMF, where the first message includes the authentication request message. This prevents the UE from discarding the unprotected authentication request message and therefore avoids a registration failure.

Figure 11A:
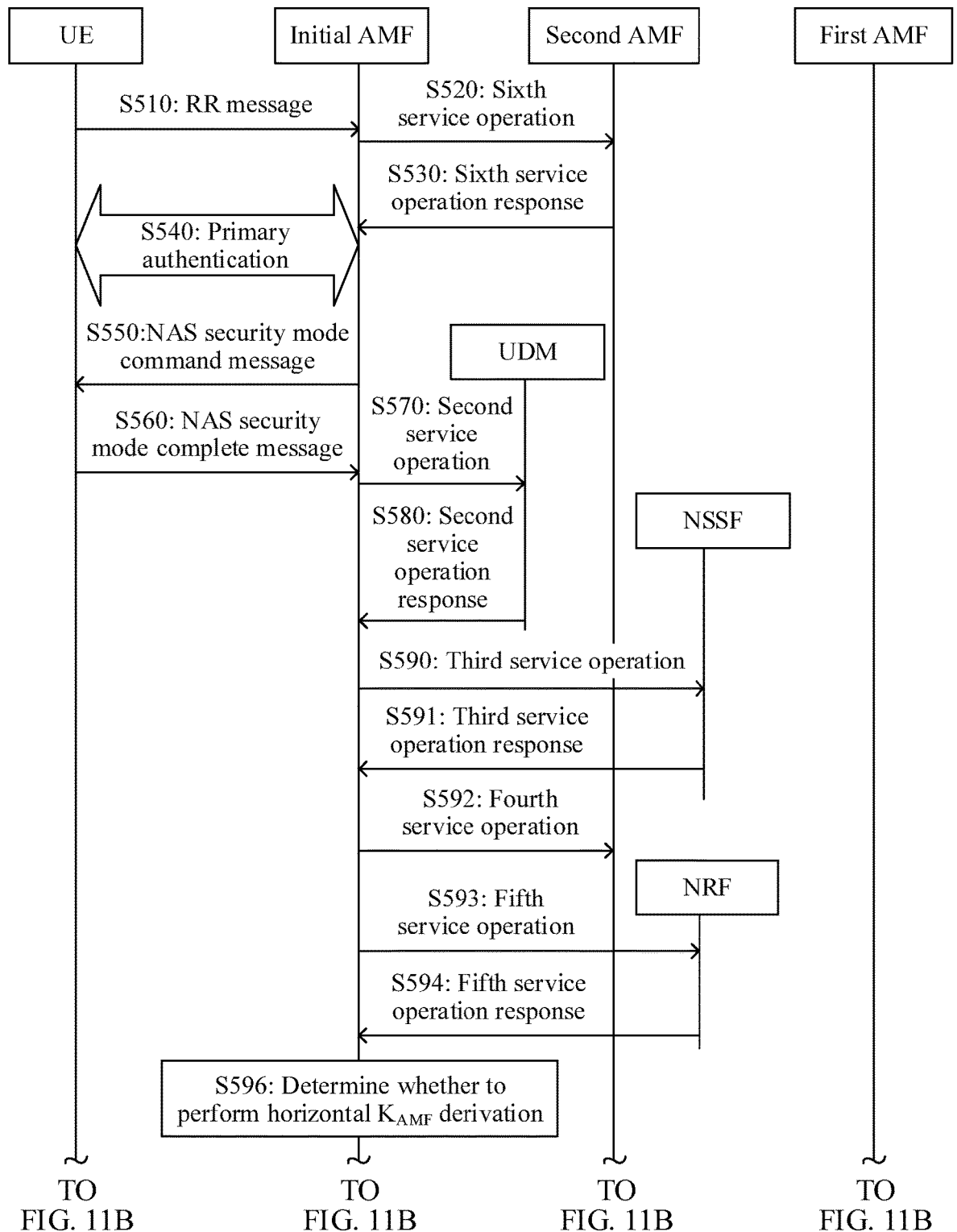
FIG. 11A, FIG. 11B, and FIG. 11C are a schematic flowchart of still another method for registration according to an embodiment of this application.
Figure 11B:
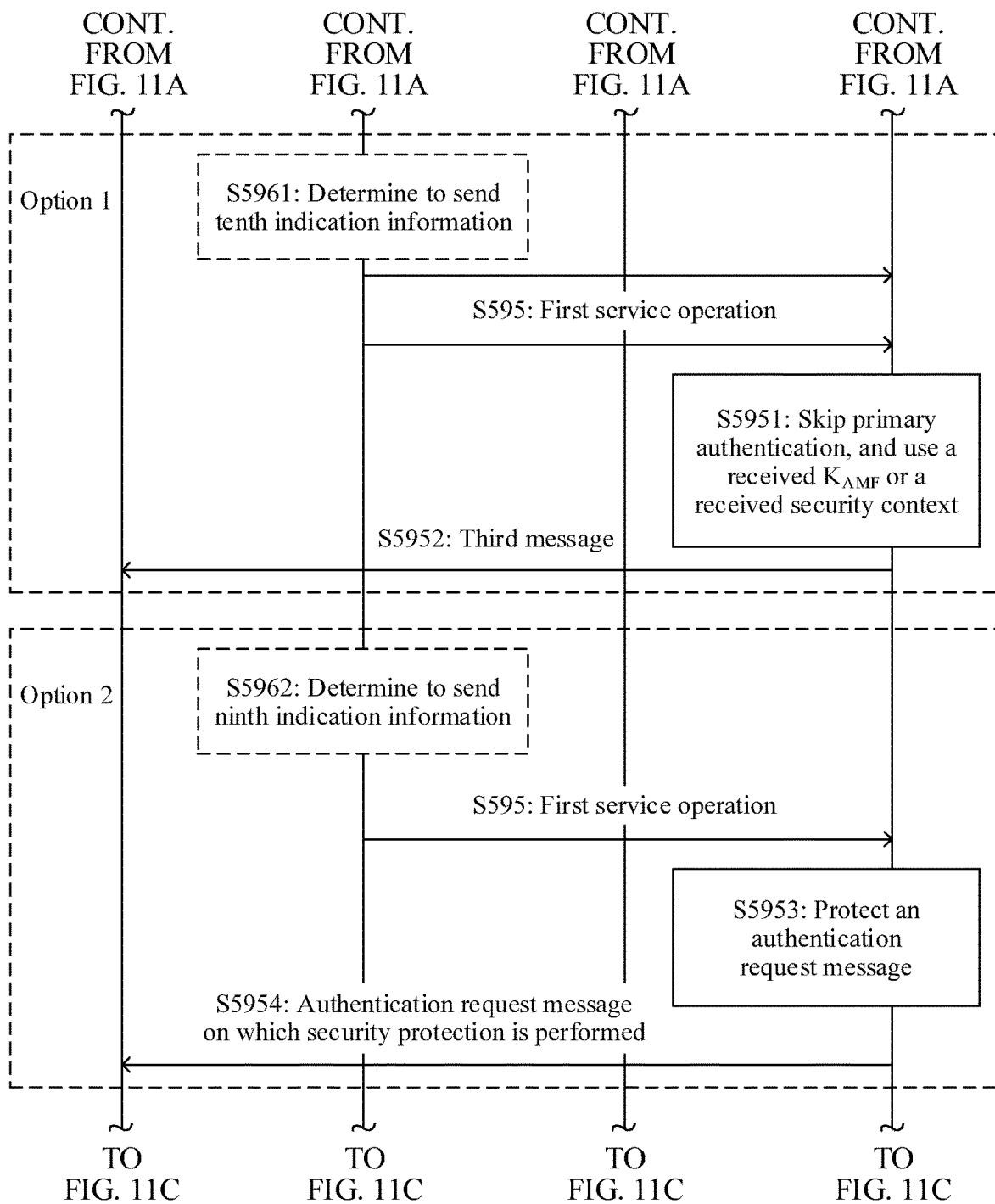
Figure 11C:
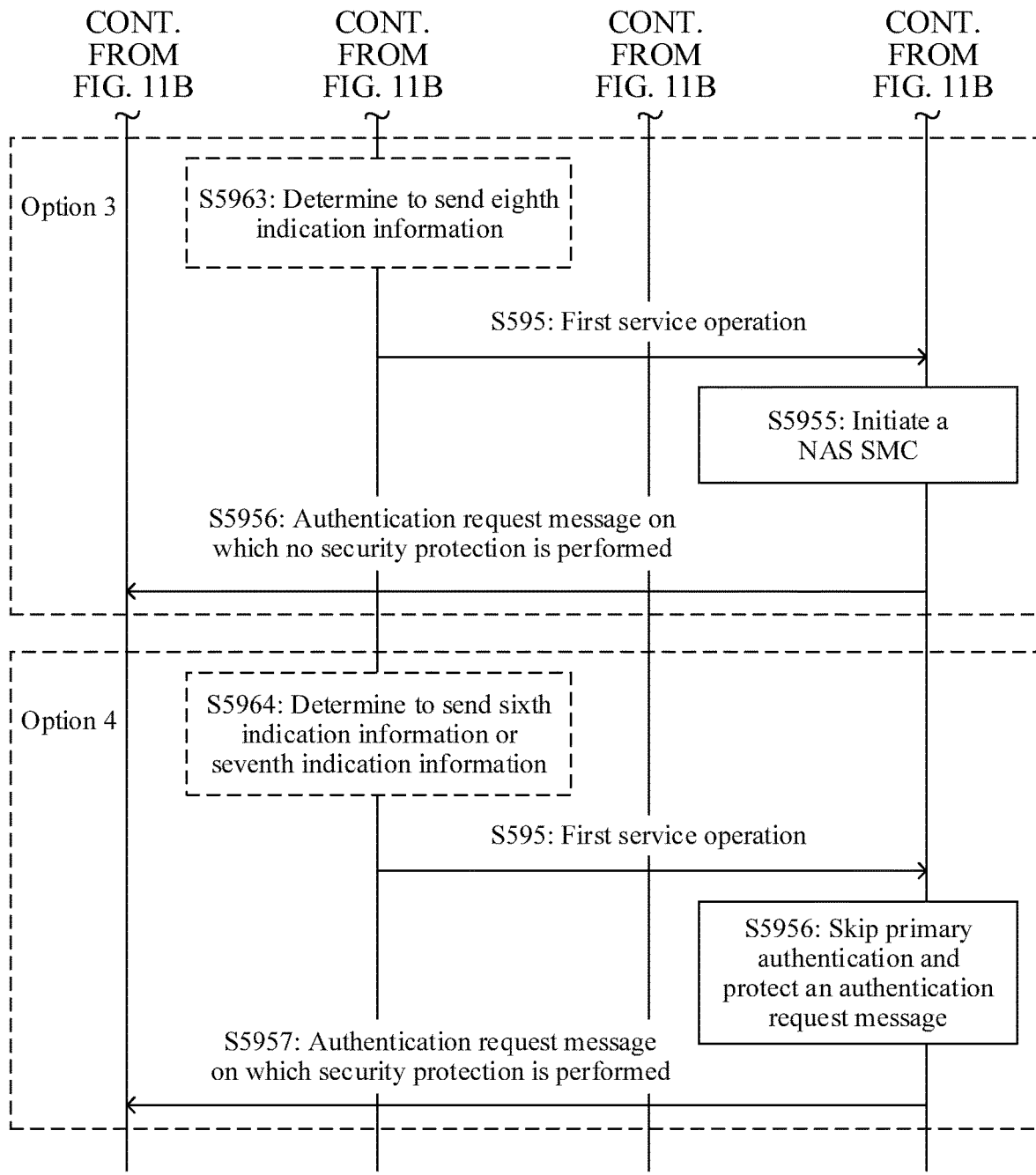

FIG. 11A, FIG. 11B, and FIG. 11C are a schematic flowchart of still another method for registration according to an embodiment of this application. Execution bodies include UE, an initial AMF, a second AMF, a first AMF, a UDM, an NSSF, and an NRF.

The method for registration includes some or all of the following steps.

S510 the UE sends an RR message to the initial AMF. This is similar to S1 in FIG. 2, and details are not described herein again.

Optionally, if the RR message received by the initial AMF carries a 5G-GUTI of the UE, the initial AMF requests a UE context from the second AMF.

In other words, the registration procedure shown in FIG. 11A may further include S520 the initial AMF invokes a sixth service operation on the second AMF. This is similar to S2 in FIG. 2, and details are not described herein again.

S530 the second AMF sends a sixth service operation response to the initial AMF. This is similar to S3 in FIG. 2, and details are not described herein again.

Optionally, when the initial AMF determines to initiate a primary authentication procedure, the registration procedure shown in FIG. 11A further includes S540 the initial AMF initiates the primary authentication procedure. This is similar to S4 in FIG. 2, and details are not described herein again.

S550 the initial AMF sends a NAS SMC message to the UE. This is similar to S5 in FIG. 2, and details are not described herein again.

S560 the UE sends a NAS SMP message to the initial AMF. This is similar to S6 in FIG. 2, and details are not described herein again.

S570 the initial AMF invokes a second service operation from the UDM. This is similar to S7 in FIG. 2, and details are not described herein again.

S580 the UDM sends a second service operation response to the initial AMF. This is similar to S8 in FIG. 2, and details are not described herein again.

S590 the initial AMF invokes a third service operation from the NSSF. This is similar to S9 in FIG. 2, and details are not described herein again.

S591 the NSSF sends a third service operation response to the initial AMF. This is similar to S10 in FIG. 2, and details are not described herein again.

S592 the initial AMF invokes a fourth service operation on the second AMF. This is similar to S1 in FIG. 2, and details are not described herein again.

S593 the initial AMF invokes a fifth service operation from the NRF. This is similar to S12 in FIG. 2, and details are not described herein again.

S594 the NRF sends a fifth service operation response to the initial AMF. This is similar to S13 in FIG. 2, and details are not described herein again.

S595 the initial AMF invokes a first service operation to the first AMF, where the first service operation is used to notify the first AMF of a received N1 message. When the initial AMF stores a complete RR message and/or a UE context, the initial AMF sends the complete RR message and/or the UE context to the first AMF through the first service operation.

Different from the registration procedure shown in FIG. 2, in this embodiment, before the initial AMF invokes the first service operation on the first AMF, the initial AMF determines whether to perform horizontal KAMF derivation. In other words, the method procedure shown in FIG. 11A further includes S596 the initial AMF determines whether to perform horizontal KAMF derivation.

If the initial AMF determines not to perform horizontal KAMF derivation, the initial AMF sends a current security context that includes including a current KAMF to the first AMF.

If the initial AMF decides to perform horizontal KAMF derivation, the initial AMF generates a new KAMF, a new security context, or a new NAS security context based on the current KAMF, and the initial AMF sends the new KAMF, the new security context, or the new NAS security context to the first AMF. In addition, the initial AMF sends a horizontal KAMF derivation indication to the first AMF. The horizontal KAMF derivation indication may be referred to as keyAmfHDerivationInd.

Optionally, the initial AMF sends a security context of the UE to the first AMF through the first service operation, where the security context includes a current security context, a new KAMF, a new security context, or a horizontal KAMF derivation indication. Optionally, the initial AMF may send the security context of the UE to the first AMF through a message other than the first service operation, where the security context includes a current security context, a new KAMF, a new security context, or a horizontal KAMF derivation indication. A specific manner in which the initial AMF sends the security context of the UE to the first AMF is not limited in this application.

The initial AMF may determine whether to perform horizontal KAMF derivation in any one of the following three manners.

Manner 1. The initial AMF does not perform horizontal KAMF derivation, that is, the initial AMF sends the current security context to the first AMF.

Manner 2. The initial AMF determines, according to a local policy, whether to perform horizontal KAMF derivation, that is, the initial AMF determines, according to a local policy, to perform horizontal KAMF derivation. Alternatively, the initial AMF determines, according to a local policy, not to perform horizontal KAMF derivation.

Manner 3. The initial AMF determines, based on a fourth preset condition, whether to perform horizontal KAMF derivation. To be specific, if the initial AMF determines that the fourth preset condition is met, the initial AMF does not perform horizontal KAMF derivation, that is, the initial AMF sends the current security context to the first AMF. If the initial AMF determines that the fourth preset condition is not met, the initial AMF determines, according to a local policy, whether to perform horizontal KAMF derivation. To be specific, the initial AMF determines, according to the local policy, to perform horizontal KAMF derivation, or the initial AMF determines, according to the local policy, not to perform horizontal KAMF derivation. The fourth preset condition is any one or more of the following conditions.

The initial AMF and the UE have securely exchanged a NAS message, the initial AMF and the UE have successfully performed a NAS SMC, the UE and the initial AMF have established a security association, the UE and the initial AMF have activated security protection, the UE and the initial AMF have established a new NAS security context, the UE and initial AMF have performed primary authentication, the initial AMF selects a security algorithm different from a security algorithm selected by the second AMF, the initial AMF uses a KAMF that is generated after horizontal KAMF derivation and that is received from the second AMF, or the initial AMF receives the horizontal KAMF derivation indication from the second AMF, and determines to use a KAMF received from the second AMF.

Different from the registration procedure shown in FIG. 2, in this embodiment, after the first AMF receives the first service operation, the first AMF performs any one of the following options.

Option 1. The first AMF does not perform the primary authentication, or the first AMF uses the received KAMF or the received security context.

It should be understood that, that the first AMF does not perform the primary authentication, or that the first AMF uses the received KAMF or the received security context means that the first AMF skips the primary authentication and performs another procedure in the registration procedure. In Option 1, the method procedure shown in FIG. 11B further includes S5951 the first AMF skips the primary authentication or the first AMF uses the received KAMF or the received security context. The first AMF protects a third message based on the received KAMF or the received security context, and sends the third message to the UE. The method procedure shown in FIG. 11B further includes S5952 the first AMF sends the third message to the UE.

Specifically, the first AMF generates a NAS encryption and decryption key and a NAS integrity key based on the received KAMF or the received security context, and protects the third message by using the generated NAS encryption and decryption key and/or the NAS integrity key. In this option, the third message is any N1 message that does not include an authentication request.

In this embodiment, the first AMF does not perform the primary authentication, that is, the first AMF uses the received KAMF or the received security context.

Option 2. The first AMF protects an authentication request message, and/or the first AMF sends an authentication request message on which security protection is performed, and/or the first AMF sends an N1 message on which security protection is performed and that includes an authentication request message. The method procedure shown in FIG. 11B further includes S5953 the first AMF protects the authentication request message. S5954 the first AMF sends the authentication request message on which security protection is performed to the UE. That the first AMF sends the authentication request message on which security protection is performed to the UE may be understood as that the first AMF sends the N1 message on which security protection is performed and that includes the authentication request message to the UE.

It should be understood that, that the first AMF protects the authentication request message is that the first AMF protects the authentication request message by using the received KAMF or the received security context, and sends the authentication request message on which security protection is performed. Specifically, the first AMF generates a NAS encryption and decryption key and a NAS integrity key based on the received KAMF or the received security context, protects the authentication request message by using the generated NAS encryption and decryption key and/or NAS integrity key, and sends the authentication request message on which security protection is performed.

It should be understood that, that the first AMF sends the authentication request message on which security protection is performed is that the first AMF protects the authentication request message by using the received KAMF or the received security context, and sends the authentication request message on which security protection is performed. Specifically, the first AMF generates the NAS encryption and decryption key and the NAS integrity key based on the received KAMF or the received security context, protects the authentication request message by using the generated NAS encryption and decryption key and/or NAS integrity key, and sends the authentication request message on which security protection is performed.

It should be understood that, in this embodiment, that the first AMF sends the N1 message on which security protection is performed and that includes the authentication request message is specifically the first AMF protects the N1 message based on the received KAMF or the received security context, and sends the N1 message on which security protection is performed. Specifically, the first AMF generates the NAS encryption and decryption key and the NAS integrity key based on the received KAMF or the received security context, protects the N1 message by using the generated NAS encryption and decryption key and/or NAS integrity key, and sends the N1 message on which security protection is performed. The N1 message herein includes the authentication request message.

Option 3. The first AMF sends an authentication request message on which no security protection is performed, or the first AMF initiates a NAS SMC. The method procedure shown in FIG. 11C further includes S5955 the first AMF initiates the NAS SMC. S5956 the first AMF sends an authentication request message on which no security protection is performed to the UE.

Option 4. The first AMF does not perform the primary authentication, or the first AMF protects an authentication request message, or the first AMF sends the N1 message on which security protection is performed and that includes the authentication request message. The method procedure shown in FIG. 11C further includes S5956 the first AMF protects the authentication request message or the first AMF does not perform the primary authentication. S5957 the first AMF sends the authentication request message on which security protection is performed to the UE. That the first AMF sends the authentication request message on which security protection is performed to the UE may be understood as that the first AMF sends the N1 message on which security protection is performed and that includes the authentication request message to the UE.

It should be understood that, in this embodiment, that the first AMF does not perform the primary authentication, that is, the first AMF uses the received KAMF or the received security context means that the first AMF skips the primary authentication and performs another procedure in the registration procedure. In this implementation, the first AMF protects a third message based on the received KAMF or the received security context. Specifically, the first AMF generates a NAS encryption and decryption key and a NAS integrity key based on the received KAMF or the received security context, and protects the third message by using the generated NAS encryption and decryption key and/or NAS integrity key. In this option, the third message is any N1 message that does not include an authentication request.

That the first AMF protects the authentication request message is that the first AMF protects the authentication request message by using the received KAMF or the received security context, and sends the protected authentication request message on which security protection is performed. Specifically, the first AMF generates the NAS encryption and decryption key and the NAS integrity key based on the received KAMF or the received security context, protects the authentication request message by using the generated NAS encryption and decryption key and/or NAS integrity key, and sends the authentication request message on which security protection is performed.

In a possible implementation of Option 1, after the first AMF receives the first service operation, the first AMF does not perform the primary authentication, or the first AMF uses the received KAMF or the received security context.

In another possible implementation of Option 1, after receiving the first service operation, the first AMF determines whether AMF redirection or direct NAS rerouting (also referred to as direct NAS reroute) occurs. If AMF redirection or direct NAS rerouting occurs, the first AMF does not perform the primary authentication, or the first AMF uses the received KAMF or the received security context. The first AMF determines, based on a registrationCtxtContainer IE carried in the first service operation, that AMF redirection occurs, and/or the first AMF determines, based on a fact that a type of the N1 message notified in the first service operation is 5GMM, that AMF redirection occurs.

In still another possible implementation of Option 1, if the first AMF receives the horizontal KAMF derivation indication sent by the initial AMF, the first AMF does not perform the primary authentication based on the horizontal KAMF derivation indication, or uses the received KAMF or the received security context based on the horizontal KAMF derivation indication.

If the first AMF does not receive the horizontal KAMF derivation indication sent by the initial AMF, the first AMF may perform any one of the following operations.

Operation 1. The first AMF still does not perform the primary authentication, or uses the received KAMF or the received security context.

Operation 2. If the first AMF performs the primary authentication according to the local policy, the first AMF should protect the authentication request message based on the received KAMF or the received security context, and send the authentication request message on which security protection is performed. If the first AMF does not perform the primary authentication according to the local policy, the first AMF protects the N1 message based on the received KAMF or the received security context, and sends the N1 message on which security protection is performed.

Operation 3. The first AMF should protect, based on the received KAMF or the received security context, the N1 message that includes the authentication request message, and send the N1 message on which security protection is performed, where the N1 message includes the authentication request message on which security protection is performed.

In still yet another possible implementation of Option 1, if the first AMF receives tenth indication information sent by the initial AMF, the first AMF does not perform the primary authentication based on the tenth indication information, or uses the received KAMF or the received security context based on the tenth indication information. The tenth indication information is used to indicate the first AMF not to perform the primary authentication, or indicate the first AMF to use the received KAMF or the received security context.

In this implementation, before S595 the initial AMF invokes the first service operation to the first AMF, the initial AMF determines to send the tenth indication information to the first AMF (In other words, the method procedure shown in FIG. 11B further includes S5961 the initial AMF determines to send the tenth indication information to the first AMF). Specifically, when the initial AMF determines that a tenth preset condition is met, the initial AMF sends the tenth indication information to the first AMF. Correspondingly, the first AMF receives the tenth indication information. Optionally, the initial AMF sends the tenth indication information to the first AMF through the first service operation. The tenth preset condition is any one or more of the following conditions.

The initial AMF and the UE have securely exchanged a NAS message, the initial AMF and the UE have successfully performed a NAS SMC, the UE and the initial AMF have established a security association, the UE and the initial AMF have activated security protection, the UE and the initial AMF have established a new NAS security context, the initial AMF has performed horizontal KAMF derivation, the UE and initial AMF have performed primary authentication, the initial AMF selects a security algorithm different from a security algorithm selected by the second AMF, the initial AMF uses a KAMF that is generated after horizontal KAMF derivation and that is received from the second AMF, or the initial AMF receives the horizontal KAMF derivation indication from the second AMF, and determines to use the KAMF received from the second AMF.

When the tenth preset condition is not met, the initial AMF does not send the tenth indication information to the first AMF. Correspondingly, the first AMF does not receive the tenth indication information. If the first AMF does not receive the tenth indication information, the first AMF may perform any one of the following operations.

Operation 1. If the first AMF determines to perform the primary authentication, the first AMF should send an authentication request message on which no security protection is performed, or the first AMF should protect the authentication request message based on the received KAMF or the received security context, and send the authentication request message on which security protection is performed.

Operation 2. If the first AMF determines not to perform primary authentication, the first AMF sends an N1 message on which no security protection is performed, or the first AMF protects the N1 message based on the received KAMF or the received security context, and sends the N1 message on which security protection is performed.

Operation 3. The first AMF should send an N1 message on which no security protection is performed, where the N1 message includes the authentication request message.

Operation 4. The first AMF protects the N1 message based on the received KAMF or the received security context, and sends the N1 message on which security protection is performed, where the N1 message includes the authentication request message.

If the first AMF does not receive the tenth indication information, the first AMF may alternatively perform any one of the following operations.

Operation 1. If the first AMF determines to perform primary authentication, and the first AMF does not receive the horizontal KAMF derivation indication, the first AMF should send an authentication request message on which no security protection is performed. Alternatively, the first AMF should protect the authentication request message based on the received KAMF or the received security context, and send the authentication request message on which security protection is performed.

Operation 2. If the first AMF receives the horizontal KAMF derivation indication, the first AMF should not perform primary authentication, or the first AMF uses the received KAMF or the received security context, or the first AMF should perform a NAS SMC.

Operation 3. If the first AMF determines to perform primary authentication, the first AMF should send an authentication request message on which no security protection is performed.

If the first AMF does not receive the tenth indication information, the first AMF may alternatively perform any one of the following operations.

Operation 1. If the first AMF determines to perform primary authentication, and the first AMF does not receive the horizontal KAMF derivation indication, the first AMF should protect the authentication request message based on the received KAMF or the received security context, and send the authentication request message on which security protection is performed.

Operation 2. If the first AMF determines to perform primary authentication, and the first AMF receives the horizontal KAMF derivation indication, the first AMF should send an authentication request message on which no security protection is performed.

The tenth indication information may be further used to indicate any one or more of the following.

The initial AMF and the UE have securely exchanged a NAS message, the UE and the initial AMF have established a security association, the UE and the initial AMF have activated security protection, the UE and the initial AMF have established a new NAS security context, the initial AMF and the UE have successfully performed a NAS SMC procedure, the initial AMF and the UE have performed primary authentication, the initial AMF receives the horizontal KAMF derivation indication from the second AMF, and determines to use the KAMF or the security context received from the second AMF, the initial AMF has performed horizontal KAMF derivation, the initial AMF has generated a new KAMF, the initial AMF selects a security algorithm different from a security algorithm selected by the second AMF, the first AMF does not perform the primary authentication procedure, the first AMF skips the primary authentication procedure and performs another procedure in registration, or the initial AMF uses the received KAMF or the received security context.

In a possible implementation of Option 2, if the first AMF receives ninth indication information sent by the initial AMF, when the first AMF determines to perform primary authentication, the first AMF should protect the authentication request message based on the ninth indication information. Specifically, the first AMF protects the authentication request message based on the received KAMF or the received security context, and sends the protection authentication request message on which security protection is performed, or the first AMF sends, based on the ninth indication information, the N1 message on which security protection is performed, where the N1 message includes the authentication request message. The ninth indication information is used to indicate the first AMF to protect the authentication request message.

In this implementation, before S595 the initial AMF invokes the first service operation to the first AMF, the initial AMF determines to send the ninth indication information to the first AMF (In other words, the method procedure shown in FIG. 11B further includes S5962 the initial AMF determines to send the ninth indication information to the first AMF). Specifically, when the initial AMF determines that a ninth preset condition is met, the initial AMF sends the ninth indication information to the first AMF. Correspondingly, the first AMF receives the ninth indication information. Optionally, the initial AMF sends the ninth indication information to the first AMF through the first service operation. The ninth preset condition is any one or more of the following conditions.

The initial AMF and the UE have securely exchanged a NAS message, the initial AMF and the UE have successfully performed a NAS SMC, the UE and the initial AMF have established a security association, the UE and the initial AMF have activated security protection, the UE and the initial AMF have established a new NAS security context, the UE and initial AMF have performed primary authentication, the initial AMF selects a security algorithm different from a security algorithm selected by the second AMF, the initial AMF uses a KAMF that is generated after horizontal KAMF derivation and that is received from the second AMF, or the initial AMF receives the horizontal KAMF derivation indication from the second AMF, and determines to use the KAMF received from the second AMF.

When the ninth preset condition is not met, the initial AMF does not send the ninth indication information to the first AMF. Correspondingly, the first AMF does not receive the ninth indication information. If the first AMF does not receive the ninth indication information, the first AMF may perform any one of the following operations.

Operation 1. If the first AMF determines to perform primary authentication, the first AMF should send an authentication request message on which no security protection is performed.

Operation 2. If the first AMF determines not to perform primary authentication, the first AMF sends an N1 message on which no security protection is performed, or the first AMF protects the N1 message based on the received KAMF or the received security context, and sends the N1 message on which security protection is performed.

Operation 3. The first AMF should send an N1 message on which no security protection is performed, where the N1 message includes the authentication request message.

Operation 4. If the first AMF determines to perform primary authentication, and the first AMF does not receive the horizontal KAMF derivation indication, the first AMF should send an authentication request message on which no security protection is performed. Alternatively, the first AMF should protect the authentication request message based on the received KAMF or the received security context, and send the authentication request message on which security protection is performed.

Operation 5. If the first AMF determines to perform primary authentication, and the first AMF receives the horizontal KAMF derivation indication, the first AMF should send an authentication request message on which no security protection is performed.

The ninth indication information may be further used to indicate any one or more of the following.

The first AMF should protect the authentication request message, the first AMF should send an authentication request message on which security protection is performed, the first AMF should protect the authentication request message, the first AMF should send an N1 message on which security protection is performed, where the N1 message includes the authentication request message, the initial AMF and the UE have securely exchanged a NAS message, the UE and the initial AMF have established a security association, the UE and the initial AMF have activated security protection, the UE and the initial AMF have established a new NAS security context, the initial AMF and the UE have successfully performed a NAS SMC procedure, the UE and initial AMF have performed primary authentication, the initial AMF receives the horizontal KAMF derivation indication from the second AMF, and determines to use the KAMF or the security context received from the second AMF, or the initial AMF selects a security algorithm different from a security algorithm selected by the second AMF.

In a possible implementation of Option 2, after receiving the first service operation, the first AMF determines whether AMF redirection or direct NAS rerouting (also referred to as direct NAS reroute) occurs. If AMF redirection or direct NAS rerouting occurs, when the first AMF determines to perform primary authentication, the first AMF should protect the authentication request message. Specifically, the first AMF protects the authentication request message based on the received KAMF or the received security context, and sends the authentication request message on which security protection is performed. Alternatively, the first AMF should send an N1 message on which security protection is performed, where the N1 message includes the authentication request message. The first AMF determines, based on a registrationCtxtContainer IE carried in the first service operation, that AMF redirection occurs, and/or the first AMF determines, based on a fact that a type of the N1 message notified in the first service operation is 5GMM, that AMF redirection occurs.

In another possible implementation of Option 2, after the first AMF receives the first service operation, if the first AMF determines to perform primary authentication, the first AMF should protect the authentication request message, or the first AMF should send an N1 message on which security protection is performed, where the N1 message includes the authentication request message. The first AMF should protect the authentication request message, to be specific, the first AMF protects the authentication request message based on the received KAMF or the received security context, and sends the authentication request message on which security protection is performed. The first AMF should send an N1 message on which security protection is performed, to be specific, the first AMF protects the N1 message based on the received KAMF or the received security context, and sends the N1 message on which security protection is performed.

In a possible implementation of Option 3, if the first AMF receives eighth indication information sent by the initial AMF, when the first AMF determines to perform primary authentication, the first AMF should send, based on the eighth indication information, an authentication request message on which no security protection is performed, or the first AMF should initiate, based on the eighth indication information, a NAS SMC. The eighth indication information is used to indicate the first AMF to send the authentication request message on which no security protection is performed. The eighth indication information may be the horizontal KAMF derivation indication.

In this implementation, before S595 the initial AMF invokes the first service operation to the first AMF, the initial AMF determines to send the eighth indication information to the first AMF (In other words, the method procedure shown in FIG. 11C further includes S5963 the initial AMF sends the eighth indication information to the first AMF). Specifically, when the initial AMF determines that an eighth preset condition is met, the initial AMF sends the eighth indication information to the first AMF. Correspondingly, the first AMF receives the eighth indication information. Optionally, the initial AMF sends the eighth indication information to the first AMF through the first service operation. The eighth preset condition is any one or more of the following conditions the initial AMF performs horizontal KAMF derivation, or the initial AMF generates a new KAMF.

When the eighth preset condition is not met, the initial AMF does not send the eighth indication information to the first AMF. Correspondingly, the first AMF does not receive the eighth indication information. If the first AMF does not receive the eighth indication information, the first AMF may perform any one of the following operations.

Operation 1. If the first AMF determines to perform primary authentication, the first AMF should protect the authentication request message based on the received KAMF or the received security context, and send the authentication request information on which security protection is performed.

Operation 2. If the first AMF determines not to perform primary authentication, the first AMF protects the N1 message based on the received KAMF or the received security context, and sends the N1 message on which security protection is performed.

Operation 3. The first AMF protects the N1 message based on the received KAMF or the received security context, and sends the N1 message on which security protection is performed, where the N1 message includes the authentication request message.

The eighth indication information may be further used to indicate any one or more of the following.

The initial AMF performs horizontal KAMF derivation, the initial AMF generates a new KAMF, the first AMF should send the authentication request message on which no security protection is performed, or the first AMF should initiate the NAS SMC.

In a possible implementation of Option 4, if the first AMF receives the horizontal KAMF derivation indication, the first AMF should not perform primary authentication, or the first AMF should use the received KAMF or the received security context, or the first AMF initiates a NAS SMC. Otherwise, if the first AMF does not receive the horizontal KAMF derivation indication but receives the seventh indication information, if the first AMF determines to initiate primary authentication, the first AMF should send, based on the seventh indication information, an authentication request message on which security protection is performed, or the first AMF needs to send, based on the seventh indication information, an N1 message on which security protection is performed, where the N1 message includes the authentication request message.

The seventh indication information is used to indicate the first AMF to send the authentication request message on which security protection is performed, or indicate the first AMF to send the N1 message on which security protection is performed.

In this implementation, before S595 the initial AMF invokes the first service operation to the first AMF, the initial AMF determines to send the seventh indication information to the first AMF (In other words, the method procedure shown in FIG. 11C further includes S5964 the initial AMF determines to send the seventh indication information to the first AMF). Specifically, when the initial AMF determines that a seventh preset condition is met, the initial AMF sends the seventh indication information to the first AMF. Correspondingly, the first AMF receives the seventh indication information. Optionally, the initial AMF sends the seventh indication information to the first AMF through the first service operation. The seventh preset condition is any one or more of the following conditions.

The initial AMF and the UE have securely exchanged a NAS message, the initial AMF and the UE have successfully performed a NAS SMC, the UE and the initial AMF have established a security association, the UE and the initial AMF have activated security protection, the UE and the initial AMF have established a new NAS security context, the UE and initial AMF have performed primary authentication, the initial AMF selects a security algorithm different from a security algorithm selected by the second AMF, the initial AMF uses a KAMF that is generated after horizontal KAMF derivation and that is received from the second AMF, or the initial AMF receives the horizontal KAMF derivation indication from the second AMF, and determines to use the KAMF or the security context received from the second AMF.

When the seventh preset condition is not met, the initial AMF does not send the seventh indication information to the first AMF. Correspondingly, the first AMF does not receive the seventh indication information. If the first AM receives neither the seventh indication information nor the horizontal KAMF derivation indication, the first AMF may perform any one of the following operations.

Operation 1. If the first AMF determines to perform primary authentication, the first AMF should protect the authentication request message based on the received KAMF or the received security context, and sends the authentication request information on which security protection is performed, or the first AMF sends an authentication request message on which no security protection is performed.

Operation 2. If the first AMF determines not to perform primary authentication, the first AMF should protect the N1 message based on the received KAMF or the received security context, and send the N1 message on which security protection is performed, or the first AMF should send an N1 message on which no security protection is performed.

Operation 3. The first AMF protects the N1 message based on the received KAMF or the received security context, and sends the N1 message on which security protection is performed, where the N1 message includes the authentication request message.

Operation 4. The first AMF should send an N1 message on which no security protection is performed, where the N1 message includes the authentication request message.

The seventh indication information may be further used to indicate any one or more of the following.

The initial AMF and the UE have securely exchanged a NAS message, the UE and the initial AMF have established a security association, the UE and the initial AMF have activated security protection, the UE and the initial AMF have established a new NAS security context, the initial AMF and the UE have successfully performed a NAS SMC procedure, the UE and initial AMF have performed primary authentication, the initial AMF receives the horizontal KAMF derivation indication from the second AMF, and determines to use the KAMF or the security context received from the second AMF, the initial AMF selects a security algorithm different from a security algorithm selected by the second AMF, the first AMF should send an authentication request message on which security protection is performed, the first AMF should protect the authentication request message, or the first AMF should send an N1 message on which security protection is performed, where the N1 message includes the authentication request message.

In another possible implementation of Option 4, if the first AMF receives sixth indication information and the horizontal KAMF derivation indication, the first AMF should not perform primary authentication, or the first AMF should use the received KAMF or the received security context. Otherwise, if the first AMF does not receive the horizontal KAMF derivation indication but receives the sixth indication information, if the first AMF determines to initiate the primary authentication, the first AMF should send, based on the sixth indication information, an authentication request message on which security protection is performed, or the first AMF needs to send, based on the sixth indication information, an N1 message on which security protection is performed, where the N1 message includes the authentication request message.

The sixth indication information is used to indicate the first AMF to send the authentication request message on which security protection is performed.

In this implementation, before S595 the initial AMF invokes the first service operation to the first AMF, the initial AMF determines to send the sixth indication information to the first AMF (In other words, the method procedure shown in FIG. 11C further includes S5964 the initial AMF determines to send the sixth indication information to the first AMF). Specifically, when the initial AMF determines that a sixth preset condition is met, the initial AMF sends the sixth indication information to the first AMF. Correspondingly, the first AMF receives the sixth indication information. Optionally, the initial AMF sends the sixth indication information to the first AMF through the first service operation. The sixth preset condition is any one or more of the following conditions.

The initial AMF and the UE have securely exchanged a NAS message, the initial AMF and the UE have successfully performed a NAS SMC, the UE and the initial AMF have established a security association, the UE and the initial AMF have activated security protection, the UE and the initial AMF have established a new NAS security context, the UE and initial AMF have performed primary authentication, the initial AMF selects a security algorithm different from a security algorithm selected by the second AMF, the initial AMF uses a KAMF that is generated after horizontal KAMF derivation and that is received from the second AMF, or the initial AMF receives the horizontal KAMF derivation indication from the second AMF, and determines to use the KAMF and the security context received from the second AMF.

When the sixth preset condition is not met, the initial AMF does not send the sixth indication information to the first AMF. Correspondingly, the first AMF does not receive the sixth indication information. If the first AMF does not receive the sixth indication information but receives the horizontal KAMF derivation indication, the first AMF may perform any one of the following operations.

Operation 1. If the first AMF determines to perform primary authentication, the first AMF should send an authentication request message on which no security protection is performed.

Operation 2. If the first AMF determines not to perform primary authentication, the first AMF should protect the N1 message based on the received KAMF or the received security context, and send the N1 message on which security protection is performed, or the first AMF should send an N1 message on which no security protection is performed, or the first AMF initiates the NAS SMC.

Operation 3. The first AMF should send an N1 message on which no security protection is performed, where the N1 message includes the authentication request message.

If the first AMF receives neither the sixth indication information nor the horizontal KAMF derivation indication, the first AMF may perform any one of the following operations.

Operation 1. If the first AMF determines to perform primary authentication, the first AMF should send an authentication request message on which no security protection is performed, or the first AMF should protect the authentication request message based on the received KAMF or the received security context, and send the authentication message on which security protection is performed.

Operation 2. If the first AMF determines not to perform primary authentication, the first AMF should protect the N1 message based on the received KAMF or the received security context, and send the N1 message on which security protection is performed, or the first AMF should send an N1 message on which no security protection is performed.

Operation 3. The first AMF should send an N1 message on which no security protection is performed, where the N1 message includes the authentication request message.

Operation 4. The first AMF should send an N1 message on which security protection is performed, where the N1 message includes the authentication request message.

The sixth indication information may be further used to indicate any one or more of the following.

The initial AMF and the UE have securely exchanged a NAS message, the UE and the initial AMF have established a security association, the UE and the initial AMF have activated security protection, the UE and the initial AMF have established a new NAS security context, the initial AMF and the UE have successfully performed a NAS SMC procedure, the UE and initial AMF have performed primary authentication, the initial AMF receives the horizontal KAMF derivation indication from the second AMF, and determines to use the KAMF or the security context received from the second AMF, the initial AMF determines to use a KAMF that is generated after horizontal KAMF derivation and that is received from the second AMF, the initial AMF selects a security algorithm different from a security algorithm selected by the second AMF, the first AMF should send an authentication request message on which security protection is performed, the first AMF should protect the authentication request message, or the first AMF should send an N1 message on which security protection is performed, where the N1 message includes the authentication request message.

In the method procedure shown in FIG. 11A, FIG. 11B, and FIG. 11C, the first AMF does not perform primary authentication or protect the authentication request message. This prevents the UE from discarding the received unprotected authentication request message.

It should be further understood that sequence numbers of the foregoing processes do not mean execution sequences in the foregoing method embodiments. The execution sequences of the processes should be determined based on functions and internal logic of the processes, and should not be construed as any limitation on the implementation processes of the embodiments of this application.

The foregoing describes in detail the method for registration provided in the embodiments of this application with reference to FIG. 3A and FIG. 3B, FIG. 4, and FIG. 11A, FIG. 11B, and FIG. 11C. The following describes in detail an apparatus for registration provided in the embodiments of this application with reference to FIG. 5 to FIG. 10.

Figure 5:
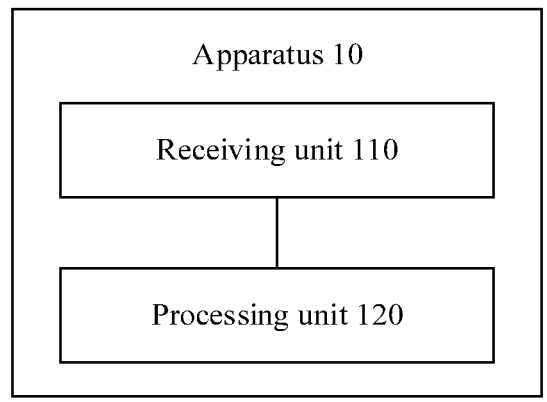
FIG. 5 is a schematic diagram of an apparatus 10 for registration according to this application.

FIG. 5 is a schematic diagram of an apparatus 10 for registration according to this application. As shown in FIG. 5, the apparatus 10 includes a receiving unit 110 and a processing unit 120.

The receiving unit 110 is configured to receive a protected first message from a first AMF.

The processing unit 120 is configured to process the protected first message, where the first AMF is a target AMF selected, during AMF redirection, to serve a UE, and the first message is one of the following messages an authentication request message, an N1 message, or an N1 message other than a NAS SMC message.

For ease of description, that the apparatus 10 for registration receives and processes the protected first message may be described as that the apparatus 10 for registration accepts the protected first message.

In this embodiment of this application, how the processing unit of the UE processes the received protected first message is not limited. For details, refer to a related stipulation in a current protocol. For example, refer to a stipulation in the current protocol about how the UE processes the protected message to obtain information in the message. Details are not described herein.

The apparatus 10 completely corresponds to the UE in the method embodiments. The apparatus 10 may be the UE in the method embodiments, or a chip or a functional module inside the UE in the method embodiments. The corresponding units of the apparatus 10 are configured to perform corresponding steps performed by the UE in the method embodiments shown in FIG. 3A and FIG. 3B, FIG. 4, and FIG. 11A, FIG. 11B, and FIG. 11C.

The receiving unit 110 in the apparatus 10 performs the receiving step performed by the UE in the method embodiments. For example, the receiving unit 110 performs step S350 in FIG. 3A of receiving a NAS security mode command message sent by an initial AMF, step S301 in FIG. 3B of receiving the protected first message sent by the first AMF, step S450 in FIG. 4 of receiving the NAS security mode command message sent by the initial AMF, step S496 in FIG. 4 of receiving an unprotected first message sent by the first AMF, step S481 in FIG. 4 of receiving second indication information sent by the initial AMF, step S550 in FIG. 11A of receiving the NAS security mode command message sent by the initial AMF, step S5952 in FIG. 11B of receiving a third message sent by the first AMF, steps S5954 in FIG. 11B and S5957 in FIG. 11C of receiving an authentication request message on which security protection is performed and that is sent by the first AMF, and step S5956 in FIG. 11C of receiving an authentication request message on which no security protection is performed and that is sent by the first AMF.

The processing unit 120 in the apparatus 10 performs the steps implemented or processed inside the UE in the method embodiments. For example, the processing unit 120 performs step S340 in FIG. 3A of performing primary authentication with the initial AMF, step S440 in FIG. 4 of performing the primary authentication with the initial AMF, and step S540 in FIG. 11A of performing the primary authentication with the initial AMF.

The apparatus 10 for registration may further include a sending unit (not shown in FIG. 5). The sending unit is configured to perform a function of sending a message to another device. For example, the sending unit performs step S310 in FIG. 3A of sending an RR message to the initial AMF, step S360 in FIG. 3A of sending a NAS security mode complete message to the initial AMF, step S410 in FIG. 4 of sending the RR message to the initial AMF, and step S460 in FIG. 4 of sending the NAS security mode complete message to the initial AMF.

The receiving unit 110 and the sending unit may constitute a transceiver unit, which has both a receiving function and a sending function. The processing unit 120 may be a processor. The sending unit may be a receiver. The receiving unit 110 may be a transmitter. The receiver and the transmitter may be integrated to constitute a transceiver.

Figure 6:
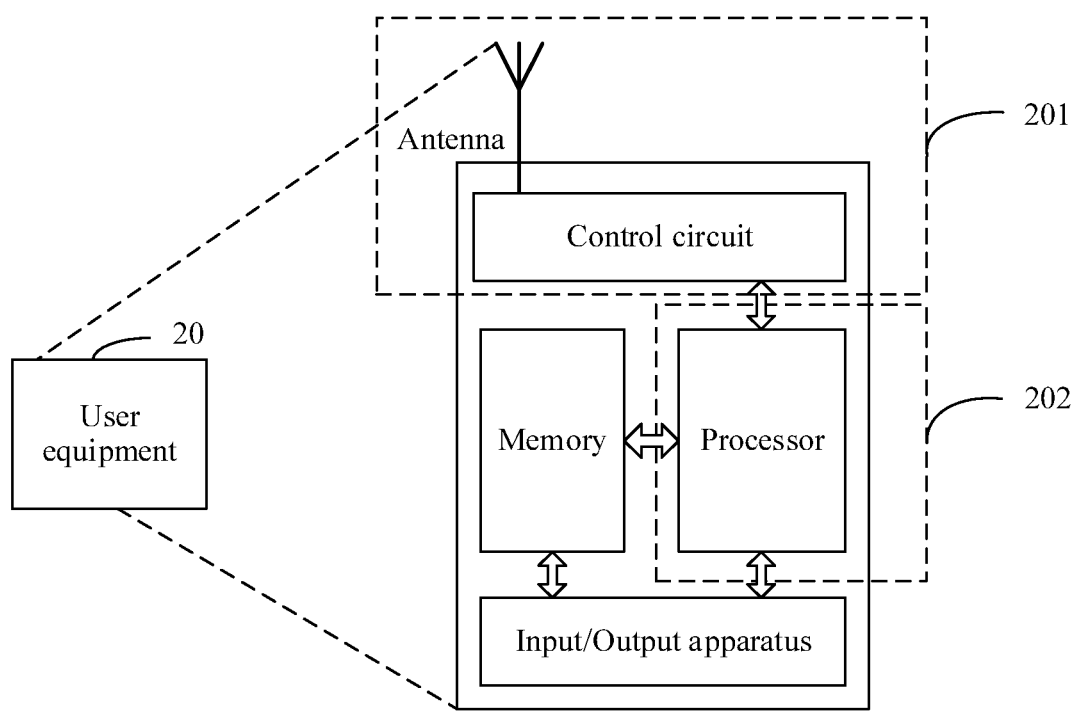
FIG. 6 is a schematic structural diagram of UE 20 according to an embodiment of this application.

FIG. 6 is a schematic structural diagram of UE 20 applicable to an embodiment of this application. The UE 20 may be applied to the system shown in FIG. 1. For ease of description, FIG. 6 shows only main components of the UE. As shown in FIG. 6, the UE 20 includes a processor, a memory, a control circuit, an antenna, and an input/output apparatus. The processor is configured to control the antenna and the input/output apparatus to send or receive a signal. The memory is configured to store a computer program. The processor is configured to invoke the computer program from the memory and run the computer program, to perform a corresponding procedure and/or operation performed by the UE in the method for registration provided in this application. Details are not described herein again.

A person skilled in the art may understand that for ease of description, FIG. 6 shows only one memory and only one processor. In actual UE, there may be a plurality of processors and a plurality of memories. The memory may also be referred to as a storage medium, a storage device, or the like. This is not limited in the embodiments of this application.

Figure 7:
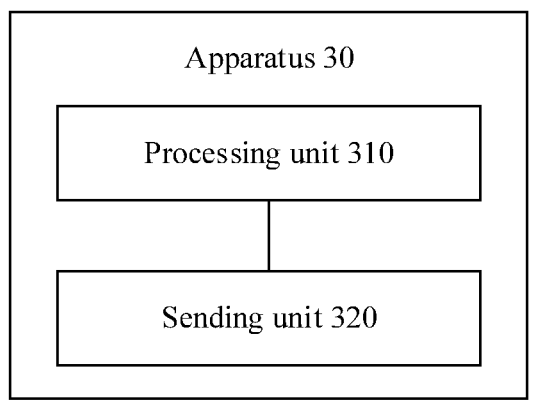
FIG. 7 is a schematic diagram of an apparatus 30 for registration according to this application.

FIG. 7 is a schematic diagram of an apparatus 30 for registration according to this application. As shown in FIG. 7, the apparatus 30 includes a processing unit 310 and a sending unit 320.

The processing unit 310 is configured to determine to send first indication information to a first AMF, where the first indication information is used to indicate the first AMF to protect a first message.

The sending unit 320 is configured to send the first indication information to the first AMF, where the first AMF is a target AMF selected, during AMF redirection, to serve a UE, and the first message is one of the following messages: an authentication request message, an N1 message, or an N1 message other than a NAS SMC message.

The apparatus 30 completely corresponds to an initial AMF in the method embodiments. The apparatus 30 may be the initial AMF in the method embodiments, or a chip or a functional module inside the initial AMF in the method embodiments. Corresponding units of the apparatus 30 are configured to perform corresponding steps performed by the initial AMF in the method embodiments shown in FIG. 3A and FIG. 3B, FIG. 4, and FIG. 11A, FIG. 1B, and FIG. 11C.

The processing unit 310 in the apparatus 30 performs the steps implemented or processed inside the initial AMF in the method embodiments. For example, the processing unit 310 performs step S396 in FIG. 3B of determining to send the first indication information to the first AMF, step S596 in FIG. 11A of determining whether to perform horizontal KAMF derivation, step S5961 in FIG. 11B of determining to send tenth indication information to the first AMF, step S5962 in FIG. 11B of determining to send ninth indication information to the first AMF, step S5963 in FIG. 11C of determining to send eighth indication information to the first AMF, and step S5964 in FIG. 11C of determining to send sixth indication information or seventh indication information to the first AMF.

The sending unit 320 in the apparatus 30 performs the sending step performed by the initial AMF in the method embodiments. For example, the sending unit 320 performs step S320 in FIG. 3A of sending a sixth service operation to a second AMF, step S350 in FIG. 3A of sending the NAS security mode command message to the UE, step S370 in FIG. 3A of sending a second service operation to a UDM, step S390 in FIG. 3A of sending a third service operation to an NSSF, step S392 in FIG. 3A of sending a fourth service operation to the second AMF, step S393 in FIG. 3A of sending a fifth service operation to an NRF, step S395 in FIG. 3A of sending the first service operation to the first AMF, step S420 in FIG. 4 of sending a sixth service operation to the second AMF, step S450 in FIG. 4 of sending the NAS security mode command message to the UE, step S470 in FIG. 4 of sending a second service operation to the UDM, step S490 in FIG. 4 of sending a third service operation to an NSSF, step S492 in FIG. 4 of sending the fourth service operation to the second AMF, step S493 of sending the fifth service operation to the NRF, step S495 in FIG. 4 of sending the first service operation to the first AMF, step S481 in FIG. 4 of sending the second indication information to the UE, step S520 in FIG. 11A of sending a sixth service operation to the second AMF, step S550 in FIG. 11A of sending the NAS security mode command message to the UE, step S570 in FIG. 11A of sending the second service operation to the UDM, step S590 in FIG. 11A of sending the third service operation to the NSSF, step S592 in FIG. 11A of sending the fourth service operation to the second AMF, step S593 in FIG. 11A of sending the fifth service operation to the NRF, and step S595 in FIG. 11A of sending the first service operation to the first AMF.

The apparatus 30 for registration may further include a receiving unit (not shown in FIG. 7). The receiving unit is configured to perform a function of receiving a message sent by another device. For example, the receiving unit performs step S310 in FIG. 3A of receiving an RR message sent by the UE, step S360 in FIG. 3A of receiving a NAS security mode complete message sent by the UE, step S330 in FIG. 3A of receiving a sixth service operation response sent by the second AMF, step S380 in FIG. 3A of receiving a second service operation response sent by the UDM, step S391 in FIG. 3A of receiving a third service operation response sent by the NSSF, step S394 in FIG. 3A of receiving a fifth service operation response sent by the NRF, step S410 in FIG. 4 of receiving the RR message sent by the UE, step S460 in FIG. 4 of receiving the NAS security mode complete message sent by the UE, step S430 in FIG. 4 of receiving the sixth service operation response sent by the second AMF, step S480 in FIG. 4 of receiving the second service operation response sent by the UDM, step S491 in FIG. 4 of receiving the third service operation response sent by the NSSF, step S494 in FIG. 4 of receiving the fifth service operation response sent by the NRF, step S510 in FIG. 11A of receiving the RR message sent by the UE, step S560 in FIG. 11A of receiving the NAS security mode complete message sent by the UE, step S530 in FIG. 11A of receiving the sixth service operation response sent by the second AMF, step S580 in FIG. 11A of receiving the second service operation response sent by the UDM, step S591 in FIG. 11A of receiving the third service operation response sent by the NSSF, and step S594 in FIG. 11A of receiving the fifth service operation response sent by the NRF.

The receiving unit and the sending unit 320 may constitute a transceiver unit, which has both a receiving function and a sending function. The processing unit 310 may be a processor. The sending unit 320 may be a receiver. The receiving unit may be a transmitter. The receiver and the transmitter may be integrated to constitute a transceiver.

Figure 8:
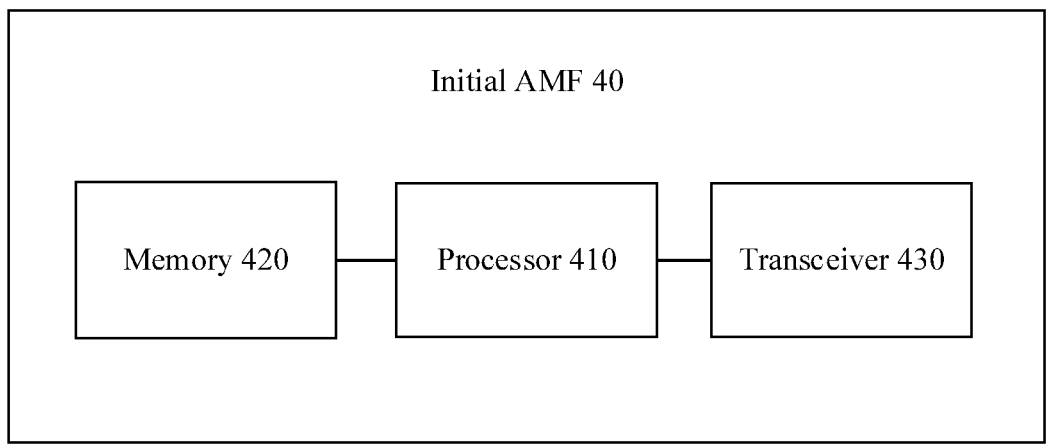
FIG. 8 is a schematic structural diagram of an initial AMF 40 applicable to an embodiment of this application.

As shown in FIG. 8, an embodiment of this application further provides an initial AMF 40. The initial AMF 40 includes a processor 410, a memory 420, and a transceiver 430. The memory 420 stores an instruction or a program. The processor 430 is configured to execute the instruction or the program stored in the memory 420. When the instruction or program stored in the memory 420 is executed, the transceiver 430 is configured to perform an operation performed by the sending unit 320 in the apparatus 30 shown in FIG. 7.

Figure 9:
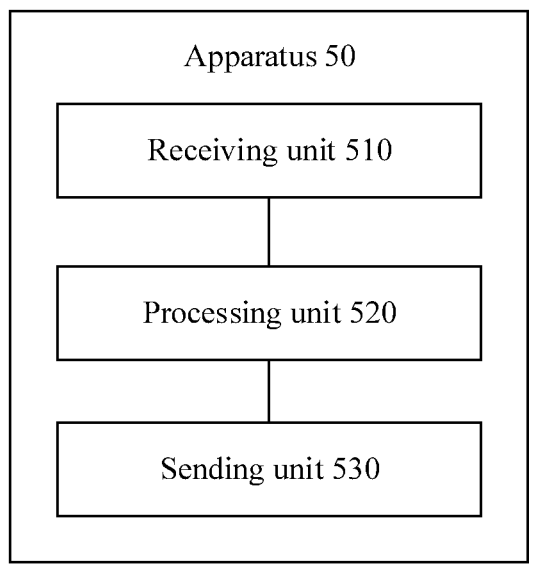
FIG. 9 is a schematic diagram of an apparatus 50 for registration according to this application.

FIG. 9 is a schematic diagram of an apparatus 50 for registration according to this application. As shown in FIG. 9, the apparatus 50 includes a receiving unit 510, a processing unit 520, and a sending unit 530.

The receiving unit 510 is configured to receive first indication information from an initial AMF.

The processing unit 520 is configured to protect a first message based on the first indication information.

The sending unit 530 is configured to send the protected first message to UE, where the apparatus for registration is a target AMF selected, during AMF redirection, to serve the UE, and the first message is one of the following messages an authentication request message, an N1 message, or an N1 message other than a NAS SMC message.

The apparatus 50 completely corresponds to a first AMF in the method embodiments. The apparatus 50 may be the first AMF in the method embodiments, or a chip or a functional module inside the first AMF in the method embodiments. Corresponding units of the apparatus 50 are configured to perform corresponding steps performed by the first AMF in the method embodiments shown in FIG. 3A and FIG. 3B, FIG. 4, and FIG. 11A, FIG. 11B, and FIG. 11C.

The receiving unit 510 in the apparatus 50 performs the receiving step performed by the first AMF in the method embodiments. For example, the receiving unit 510 performs step S395 in FIG. 3A of receiving a first service operation sent by the initial AMF, and step S495 in FIG. 4 of receiving the first service operation sent by the initial AMF.

The processing unit 520 performs the steps implemented or processed inside the first AMF in the method embodiments. For example, the processing unit 520 performs step S399 in FIG. 3B of determining that AMF redirection occurs, step S398 in FIG. 3B of protecting the first message, step S302 in FIG. 3B of skipping primary authentication based on the first indication information, step S303 in FIG. 3B in which the primary authentication is not performed based on the first service operation, step S5951 in FIG. 11B of skipping the primary authentication, step S5953 in FIG. 11B of protecting the authentication request message, step S5955 in FIG. 11C of initiating the primary authentication, and step S5956 in FIG. 11C of skipping the primary authentication or protecting the authentication request message.

The sending unit 530 performs the sending step performed by the first AMF in the method embodiments. For example, the sending unit 530 performs step S301 in FIG. 3B of sending the protected first message to the UE, step S496 in FIG. 4 of sending an unprotected first message to the UE, step S5952 in FIG. 11B of sending a third message to the UE, steps S5954 and S5957 in FIG. 11C of sending an authentication request message on which security protection is performed to the UE, and step S5956 in FIG. 11C of sending an authentication request message on which no security protection is performed to the UE.

The receiving unit 510 and the sending unit 530 may constitute a transceiver unit, which has both a receiving function and a sending function. The processing unit 520 may be a processor. The sending unit 530 may be a receiver. The receiving unit 510 may be a transmitter. The receiver and the transmitter may be integrated to constitute a transceiver.

Figure 10:
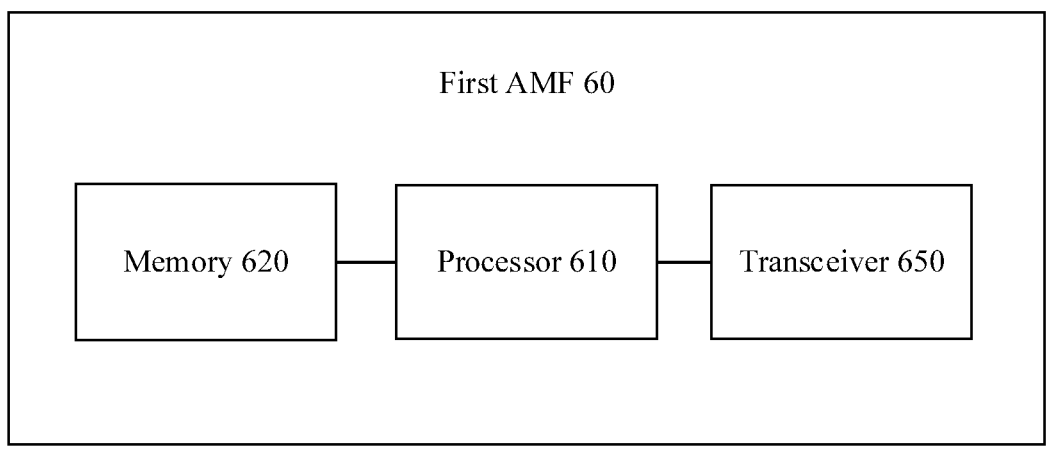
FIG. 10 is a schematic structural diagram of a first AMF 60 applicable to an embodiment of this application.

As shown in FIG. 10, an embodiment of this application further provides a first AMF 60. The first AMF 60 includes a processor 610, a memory 620, and a transceiver 630. The memory 620 stores an instruction or a program. The processor 610 is configured to execute the instruction or the program stored in the memory 620. When the instruction or program stored in the memory 620 is executed, the transceiver 630 is configured to perform the operations performed by the receiving unit 510 and the sending unit 530 in the apparatus 50 shown in FIG. 9.

An embodiment of this application further provides a communications system, including the foregoing initial AMF, the first AMF, and one or more UEs.

This application further provides a computer-readable storage medium. The computer-readable storage medium stores an instruction. When the instruction is run on a computer, the computer is enabled to perform the steps performed by an initial AMF in the methods shown in FIG. 3A and FIG. 3B, FIG. 4, and FIG. 11A, FIG. 11B, and FIG. 11C.

This application further provides a computer-readable storage medium. The computer-readable storage medium stores an instruction. When the instruction is run on a computer, the computer is enabled to perform the steps performed by a first AMF in the methods shown in FIG. 3A and FIG. 3B, FIG. 4, and FIG. 11A, FIG. 11B, and FIG. 11C.

This application further provides a computer-readable storage medium. The computer-readable storage medium stores an instruction. When the instruction is run on a computer, the computer is enabled to perform the steps performed by UE in the methods shown in FIG. 3A and FIG. 3B, FIG. 4, and FIG. 11A, FIG. 11B, and FIG. 11C.

This application further provides a computer program product including an instruction. When the computer program product runs on a computer, the computer is enabled to perform the steps performed by an initial AMF in the methods shown in FIG. 3A and FIG. 3B, FIG. 4, and FIG. 11A, FIG. 11B, and FIG. 11C.

This application further provides a computer program product including an instruction. When the computer program product runs on a computer, the computer is enabled to perform the steps performed by a first AMF in the methods shown in FIG. 3A and FIG. 3B, FIG. 4, and FIG. 11A, FIG. 11B, and FIG. 11C.

This application further provides a computer program product including an instruction. When the computer program product runs on a computer, the computer is enabled to perform the steps performed by UE in the methods shown in FIG. 3A and FIG. 3B, FIG. 4, and FIG. 11A, FIG. 11B, and FIG. 11C.

This application further provides a chip, including a processor. The processor is configured to read a computer program stored in a memory and run the computer program, to perform a corresponding operation and/or procedure performed by UE in the method for registration provided in this application. Optionally, the chip further includes the memory. The memory is connected to the processor through a circuit or a cable. The processor is configured to read the computer program from the memory and execute the computer program. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

This application further provides a chip, including a processor. The processor is configured to invoke a computer program stored in the memory and run the computer program, to perform a corresponding operation and/or procedure performed by an initial AMF in the method for registration provided in this application. Optionally, the chip further includes the memory. The memory is connected to the processor through a circuit or a cable. The processor is configured to read the computer program from the memory and execute the computer program. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

This application further provides a chip, including a processor. The processor is configured to invoke a computer program stored in the memory and run the computer program, to perform a corresponding operation and/or procedure performed by a first AMF in the method for registration provided in this application. Optionally, the chip further includes the memory. The memory is connected to the processor through a circuit or a cable. The processor is configured to read the computer program from the memory and execute the computer program. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It should be understood that the foregoing chip may also be replaced by a chip system, and details are not described herein.

In this application, the terms "include", "have" and any other variants mean to cover the non-exclusive inclusion, for example, a process, method, system, product, or device that includes a list of steps or units is not necessarily limited to those steps or units that are clearly listed, but may include other steps or units not expressly listed or inherent to such a process, method, product, or device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a Universal Serial Bus (USB) flash drive, a removable hard disk, a read-only memory (ROM), a random access memory (RAM), a magnetic disk, or an optical disc.

In addition, the term "and/or" in this application describes only an association relationship for describing associated objects and indicates that three relationships may exist. For example, A and/or B may indicate the following three cases only A exists, both A and B exist, and only B exists. In addition, the character "/" in this specification generally indicates an "or" relationship between the associated objects. The term "at least one" in this application may represent "one" and "two or more". For example, at least one of A, B, and C may indicate the following seven cases only A exists, only B exists, only C exists, both A and B exist, both A and C exist, both C and B exist, and A, B, and C exist.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for registration, wherein the method comprises:
    determining, by a first access and mobility management function (AMF) according to a local policy, whether to perform horizontal derivation on a first key during a redirection procedure of a user equipment (UE) to or from a second AMF;
    sending, by the first AMF to second to the second AMF, indication information indicating that the horizontal derivation has been performed on the first key when the first AMF determines to perform the horizontal derivation on the first key, or sending by the first AMF to the second AMF, a first security context other than the indication information when the first AMF determines not to perform the horizontal derivation on the first key;
    when the second AMF determines to perform an authentication and when the second AMF receives the first security context other than the indication information, protecting, by the second AMF, an authentication request message using the first security context to generate a protected authentication request message, and sending, by the second AMF, the protected authentication request message to the UE; and
    when the second AMF receives the indication information, performing, by the second AMF, a non-access stratum security mode command (NAS SMC).

2. The method of claim 1, further comprising generating, by the first AMF, the first security context after authentication by the first AMF and the UE, wherein the first security context comprises the first key.

3. The method of claim 1, wherein the first security context is from a third AMF, and wherein the first security context comprises the first key.

4. The method of claim 1, further comprising sending, by the first AMF to the second AMF, a second security context when the first AMF determines to perform the horizontal derivation on a second key, wherein the second security context is based on the first security context, and wherein performing the NAS SMC comprises performing, by the second AMF, the NAS SMC using the second security context.

5. The method of claim 4, wherein the second security context further comprises a third key based on the first key.

6. The method of claim 5, wherein the second key is an AMF key ($K_{AMF}$).

7. A system for registration, wherein the system comprises:
    a first access and mobility management function (AMF) configured to:
        determine, according to a local policy, whether to perform horizontal derivation on a first key during a redirection procedure of a user equipment (UE) to or from a second AMF; and
        send, to the second AMF, indication information indicating that the horizontal derivation has been performed on the first key when the first AMF determine to perform the horizontal derivation on the first key, or send, to the second AMF, a first security context other than the indication information when the first AMF determines not to perform the horizontal derivation on the first key; and
    the second AMF coupled to the first AMF and configured to:
        when determining to perform an authentication and when receiving the first security context other than the indication information, protect an authentication request message using the first security context to generate a protected authentication request message, and send, the protected authentication request message to the UE; and
        when receiving the indication information, perform a non-access stratum security mode command (NAS SMC).

8. The system of claim 7, wherein the first AMF is further configured to generate the first security context after authentication by the first AMF and the UE, and wherein the first security context comprises the first key.

9. The system of claim 7, wherein the first security context is from a third AMF, and wherein the first security context comprises the first key.

10. The system of claim 7, wherein the first AMF is further configured to send, to the second AMF, a second security context when the first AMF determines to perform the horizontal derivation on a second key, wherein the second security context is based on the first security context, and wherein the second AMF is further configured to perform the NAS SMC using the second security context.

11. The system of claim 10, wherein the second security context further comprises a third key based on the first key.

12. The system of claim 10, wherein the second key is an AMF key ($K_{AMF}$).

13. A method for registration, wherein the method comprises:
- receiving, by a second access and mobility management function (AMF) from a first AMF, a security context other than indication information indicating that a horizontal derivation has been performed on a first key;
- determining, by a second AMF, whether to perform an authentication; and
- when the second AMF determines to perform authentication and when the second AMF receives the security context other than the indication information, protecting, by the second AMF, an authentication request message using the security context to generate a protected authentication request message, and sending, the protected authentication request message to a user equipment (UE).

14. The method of claim 13, further comprising generating, by the first AMF, the security context after authentication by the first AMF and the UE, wherein the security context comprises the first key.

15. The method of claim 14, wherein the security context is from a third AMF, and wherein the security context comprises the first key.

16. A second access and mobility management function (AMF) comprising:
- a transceiver configured to receive, from a first AMF, a security context other than indication information indicating that a horizontal derivation has been performed on a first key; and
- a processor coupled to the transceiver and configured to determine to perform an authentication,
- wherein when the processor determines to perform the authentication and when the transceiver receives the security context other than the indication information, the processor is further configured to protect an authentication request message using the security context to generate a protected authentication request message, and the transceiver is further configured to send the protected authentication request message to a user equipment (UE).

17. The second AMF of claim 16, wherein the security context is based on authentication by the first AMF and the UE, and wherein the first key is comprised in the security context.

18. The second AMF of claim 17, wherein the security context is from a third AMF, and wherein the first key is comprised in the security context.

* * * * *

UNITED STATES PATENT AND TRADEMARK OFFICE
CERTIFICATE OF CORRECTION

PATENT NO. : 11,606,768 B2
APPLICATION NO. : 17/180032
DATED : March 14, 2023
INVENTOR(S) : Juan Deng It is certified that error appears in the above-identified patent and that said Letters Patent is hereby corrected as shown below:

In the Claims

Claim 6, Column 50, Line 26: "claim 5" should read "claim 4"

Claim 7, Column 50, Line 39: "AMF determine" should read "AMF determines"

Signed and Sealed this
Ninth Day of May, 2023

*Katherine Kelly Vidal*

Katherine Kelly Vidal
*Director of the United States Patent and Trademark Office*